(12) United States Patent
Bamberg

(10) Patent No.: US 12,277,421 B2
(45) Date of Patent: Apr. 15, 2025

(54) MESSAGE-BASED PROCESSING WITH ASSIGNMENT OF NEURAL NETWORK LAYERS TO PROCESSOR CLUSTERS

(71) Applicant: Snap Inc., Santa Monica, CA (US)

(72) Inventor: Lennart Bamberg, Hamburg (DE)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/017,538

(22) PCT Filed: Jul. 23, 2021

(86) PCT No.: PCT/EP2021/070666
§ 371 (c)(1),
(2) Date: Jan. 23, 2023

(87) PCT Pub. No.: WO2022/018261
PCT Pub. Date: Jan. 27, 2022

(65) Prior Publication Data
US 2023/0266974 A1    Aug. 24, 2023

(30) Foreign Application Priority Data
Jul. 24, 2020  (EP) .................................... 20187770

(51) Int. Cl.
*G06F 9/38*     (2018.01)
*G06F 9/355*    (2018.01)
*G06F 15/78*    (2006.01)

(52) U.S. Cl.
CPC .......... *G06F 9/3877* (2013.01); *G06F 9/3555* (2013.01)

(58) Field of Classification Search
CPC ...... G06F 9/3555; G06F 9/3877; G06F 9/546; G06F 15/7807; G06F 15/7825; G06F 15/80; G06F 15/8046; G06N 3/063
See application file for complete search history.

(56) References Cited

U.S. PATENT DOCUMENTS 11,468,145 B1 *  10/2022  Duong .................. G06N 3/063
11,842,230 B2    12/2023  Pires Dos Reis Moreira et al.
(Continued)

FOREIGN PATENT DOCUMENTS

EP    3944153    1/2022
EP    4185998    5/2023
(Continued)

OTHER PUBLICATIONS

European Patent Office, International Search Report in corresponding International Application No. PCT/EP2021/070666, dated Aug. 19, 2021 (2 pages).
(Continued)

*Primary Examiner* — Jacob Petranek
(74) *Attorney, Agent, or Firm* — Schwegman Lundberg & Woessner, P.A.

(57) ABSTRACT

The present application discloses a message based multi-processor system comprising a message exchange network and a plurality of processor clusters to mutually exchange messages. A processor cluster comprises one or more processor cluster elements, and a message generator. The message based multi-processor system is configured as a neural network processor system having a plurality of neural network processing layers each being assigned one or more of the processor clusters. The message generator of a processor cluster comprises a logic module. The logic module, in response to an activation signal of a processor cluster element, selectively generates and transmits a message for each of a set of destination processor clusters in accordance with respective message generation control data for said destination processor clusters stored in a message generator control storage space.

20 Claims, 24 Drawing Sheets

(56) References Cited

U.S. PATENT DOCUMENTS

| 11,960,946 | B2 | | 4/2024 | Yousefzadeh et al. |
|---|---|---|---|---|
| 2018/0189645 | A1 | | 7/2018 | Chen et al. |
| 2018/0322386 | A1 | * | 11/2018 | Sridharan ................ G06F 9/54 |
| 2019/0042915 | A1 | | 2/2019 | Akin et al. |
| 2019/0324759 | A1 | * | 10/2019 | Yang ...................... G06F 15/80 |
| 2021/0374947 | A1 | * | 12/2021 | Shin .................... G06V 10/776 |

FOREIGN PATENT DOCUMENTS

| JP | 2019204492 A | 11/2019 |
|---|---|---|
| JP | 2023535749 | 8/2023 |
| KR | 20230070448 | 5/2023 |
| WO | WO-2020078945 A1 | 4/2020 |
| WO | 2022018261 | 1/2022 |

OTHER PUBLICATIONS

"International Application Serial No. PCT/EP2021/070666, Written Opinion mailed Aug. 19, 2021", 7 pgs.

"International Application Serial No. PCT/EP2021/070666, International Preliminary Report on Patentability mailed Feb. 2, 2023", 9 pgs.

"European Application Serial No. 20187770.1, Extended European Search Report mailed Jan. 26, 2021", 9 pgs.

"European Application Serial No. 20187770.1, Noting of loss of rights pursuant to Rule 112(1) EPC mailed Aug. 17, 2022", 2 pgs.

"European Application Serial No. 21748885.7, Response to Communication pursuant to Rules 161(2) and 162 EPC filed Aug. 28, 2023", 28 pgs.

"Japanese Application Serial No. 2023-504846, Notification of Reasons for Rejection mailed Jan. 28, 2025", W/English Translation, 10 pgs.

* cited by examiner

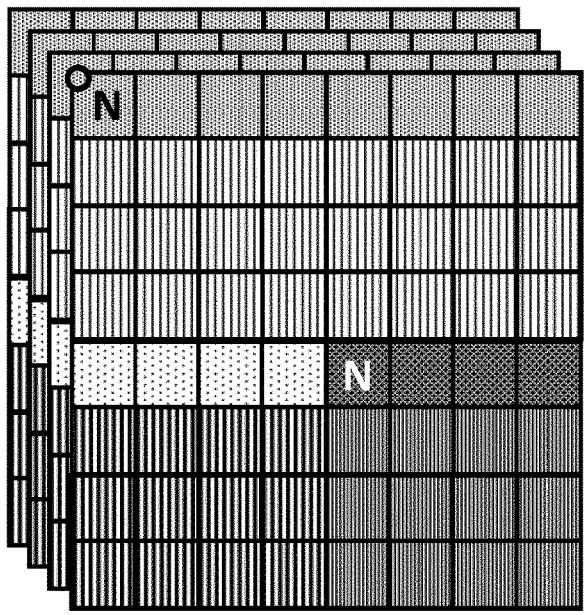
FIG. 10
Source Feature Maps
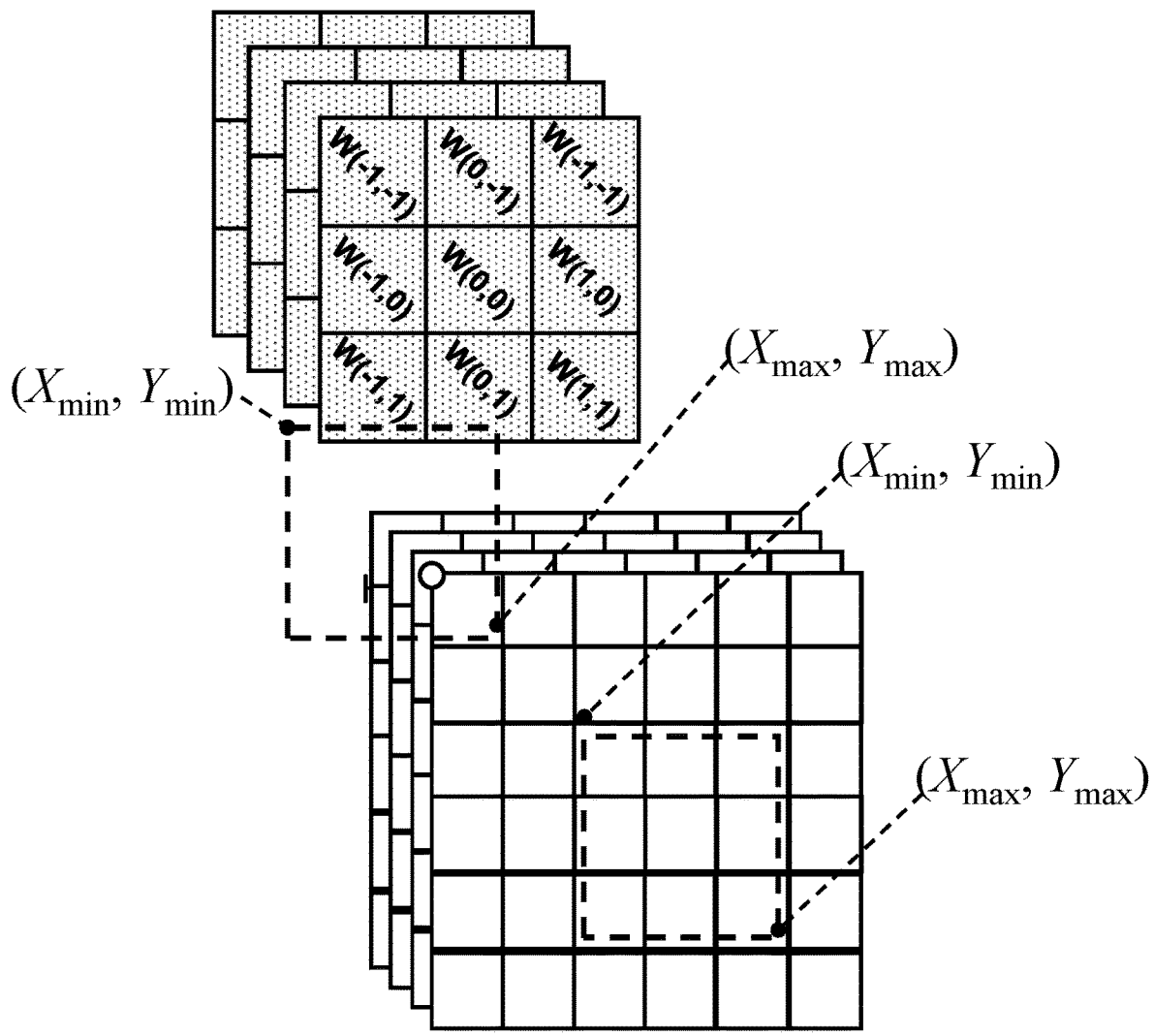

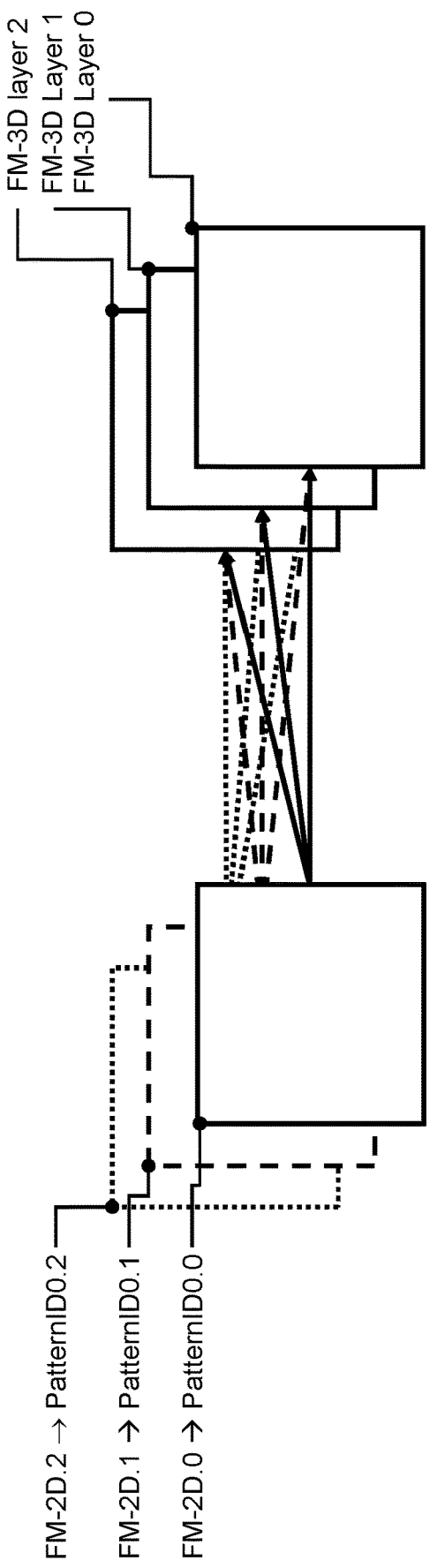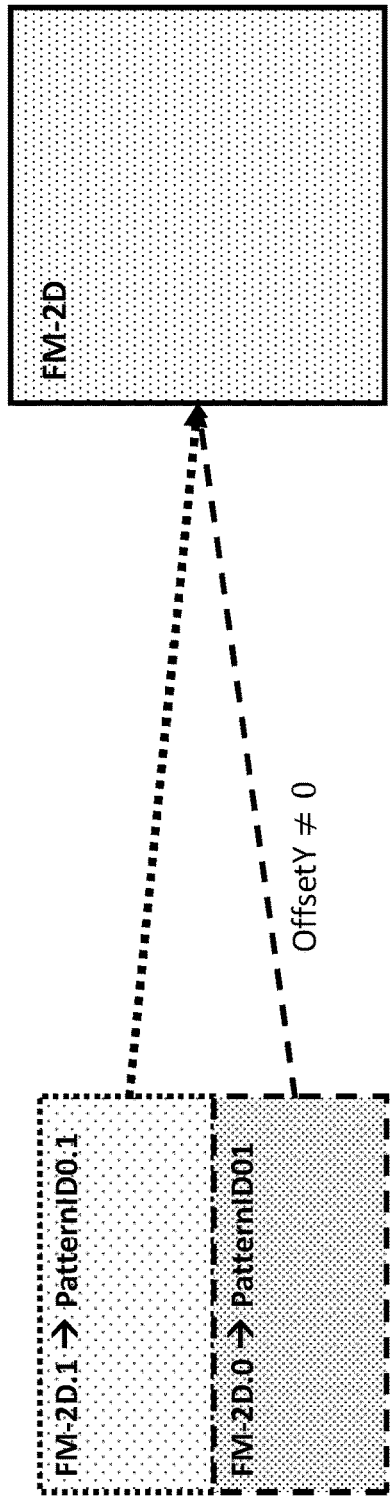
FIG. 12A
FIG. 12B

MESSAGE-BASED PROCESSING WITH ASSIGNMENT OF NEURAL NETWORK LAYERS TO PROCESSOR CLUSTERS

CROSS-REFERENCE TO RELATED APPLICATIONS

This patent application is a U.S. National Phase of PCT International Application No. PCT/EP2021/070666, filed Jul. 23, 2021, which claims priority to European Application No. 20187770.1, filed Jul. 24, 2020, which are both expressly incorporated by reference in their entireties, including any references contained therein.

BACKGROUND

The present application pertains to a message based multi-processor system configurable as a deep neural network.

The present application further pertains to a method of operating the message based multi-processor system.

Deep neural networks comprise a plurality of neural network layers. Each neural network layer comprises a plurality of neural network computation elements. Neural network computation elements in a layer may receive weighted inputs from neural network computation elements in a preceding layer or an input device and in turn may have outputs to neural network computation elements in a succeeding layer. The specific way in which a neural network layer is connected to a preceding layer depends on its type. By way of example, in a fully connected layer (FC) each neural network computation element may receive an input from a neural network computation element in a preceding layer. In a convolutional layer each neural network core element may receive an input from neural network core element of a preceding layer that is within the range of a convolution kernel centered around a local address corresponding to a local address in the convolutional layer. A pooling layer is used for a spatial dimension reduction. Respective neural network core elements of a pooling layer correspond to respective sets of neural network core elements in the preceding layer. A pooling operation for a respective neural network core elements of a pooling layer for example involves selecting a value from its respective set of neural network core elements in the preceding layer, e.g. sampling a maximum value, a minimum value, a median value or a value of a specific one of the respective set of neural network core elements. Alternatively, the pooling operation involves computing the average value from the respective set of neural network core elements in the preceding layer.

A message based multi-processor system comprises a message exchange network and a plurality of processor clusters capable to mutually exchange messages via the message exchange network. Each processor cluster typically comprises one or more processor cluster elements. A message based multi-processor system can be configured as a deep neural network. In that case the processor cluster elements are configured as neural network core elements. This can be achieved in that the processor cluster elements are provided as dedicated hardware. Alternatively the processor cluster elements may be programmed to function as neural network core elements. Processor cluster elements may have a proper processor, but may alternatively share a common processor. In practice the number of neural network core elements of a neural network layer is sometimes larger than the number of processor elements in a processor cluster. So that, when configuring a message base multiprocessor system a plurality of processor clusters is assigned to a neural network layer.

In operation a processor cluster element configured as a neural network core element may receive input messages and transmit output messages. As the neural network layers typically comprise a plurality of processor clusters, the transmission of an output message requires a preparatory stage wherein it is determined which of the processor clusters of the succeeding destination layer is to be addressed. In known approaches, a look-up table is used having for each processor cluster element of a core an entry specifying the proper destination core that has the processor cluster element that is to receive the message. This approach, however, requires a substantial amount of memory.

SUMMARY

It is an object of the present disclosure to provide an improved message based multi-processor system that is configurable as a deep neural network while requiring less memory.

This object is achieved with the message based multi-processor system. The improved message based multi-processor system claimed therein comprises a message exchange network and a plurality of processor clusters. The processor clusters each comprise a plurality of processor cluster elements and a message generator with which it can transmit messages to destination cores via the message exchange network. The claimed message based multiprocessor system is configurable as a neural network processor system having a plurality of neural network processing layers that each are assigned one or more of the processor clusters with their associated processor cluster elements being neural network processing elements therein. Also it is possible that a plurality of neural network processing layers is assigned to a common processor cluster. In some embodiments, a processor cluster element is a full fledged processor, having its own processing and storage facilities. In other embodiments the processor cluster elements share a common processing facility that performs processing tasks for the processor cluster elements in a time-shared manner. The message generator of a processor cluster associated with a neural network processing layer comprises a logic module and an associated message generator control storage space that comprises respective message generation control data for respective destination processor clusters in a set of destination processor clusters. In operation, the logic module performs a respective computation using the message generation control data for each destination processor cluster in the set of destination processor clusters to determine whether or not said respective destination processor cluster is a target of said processor cluster element. In this way large scale neuromorphic networks can be implemented in a massively parallel multi processor system.

The message generator control storage space may be provided in a rewritable memory, so that the message based multi-processor system can be reconfigured. Alternatively the storage space may be of a permanent nature so that the message based multi-processor system can be configured once for a specific purpose. Also hybrid solutions are possible, wherein some processor clusters have a permanent message generator control storage space and others have a rewritable storage space, or wherein some control data is stored permanently, and other control data is rewritable.

A neural network layer may represent one or more feature maps. A feature map specifies a feature value of a feature as a function in a coordinate space. As an elementary example the feature may be the color blue in an image, and the feature map specifies the intensity value for the color blue as a function of spatial coordinates in the image, e.g. a 2-dimensional or a 3-dimensional image. The feature may be a vector, e.g. specifying the intensity values for the colors red, green and blue respectively. In that case, the feature map specifies the vector with intensity values for the colors red, green and blue as a function of spatial coordinates in the image, e.g. a 2-dimensional or a 3-dimensional image. In practice any feature or vector thereof may be mapped, e.g. a vector indicating for respective spatial directions a likelihood that an edge is present in an image. Also the feature may represent a spatial relationship that is learned by the neural network processor from available training data. A feature map may be represented in a neural network, in that each element in the feature map is assigned a processor cluster element of a processor cluster. This implies that the state of the processor cluster element indicates a value of a feature for a particular coordinate in the feature map. In case the feature is a component of a feature vector, each component of the feature vector is represented by a respective processor cluster element.

It is a further object to provide an improved method of operating a message based multi-processor system. According thereto, the message based multi-processor system is operated as follows.

In a preparatory phase, the message based multiprocessor system is configured as a neural network processor having a plurality of neural network processing layers. Therewith a respective subset of one or more of the processor clusters with their associated processor cluster elements is assigned to each neural network processing layer, so that the processor cluster elements form neural network processing elements therein. The preparatory phase comprises writing in respective storage entries of the message generator control storage space of a source processor cluster respective sets of control data for respective destination processor clusters in a subsequent neural network processing layer. Therewith each source processor cluster is provided with the control data relevant to its associated destination processor clusters.

Once the preparatory phase is completed the configured message based multiprocessor system can assume an operational phase. The operational phase may start immediately after completion of the preparatory phase, but may alternatively start at a later point in time. During the operational phase the processor cluster elements are capable to issue the transmission of information about the state of a certain neural network processing element (with a given ID) to all affected cores. In some embodiments the processor cluster element is configured as a spiking neural processor cluster element (i.e., only if certain requirements are fulfilled the state value is sent out). In that case the activation signal indicates the spiking condition. Alternatively the activation signal may be associated with an internal clock signal of the processor cluster element. A processor cluster element that issues an activation signal is denoted a source processor cluster element. The processor cluster comprising the source processor cluster element is denoted the source processor cluster.

In response to the activation signal associated with a neural network processing element identified by a neural network processor element ID, the message generator is activated and performs the following steps for each set ($i=1, \ldots, n_d$) of control data of the source processor cluster. Therein $n_d$ is the number of destination processor clusters of the source processor cluster. The processor element ID may be a single number or may be a set of coordinates.

a) It retrieves the $i^{th}$ set of control data from the $i^{th}$ respective storage entry.

b) Based on the control data the logic unit determines whether or not a message is to be transmitted by the source processor cluster element to the destination processor cluster specified by the control data.

c) If the result of the determination is affirmative, an output message is transmitted to the $i^{th}$ designated processor cluster.

Whereas a separate storage entry is required for each destination core, the number of destination cores is typically substantially smaller than the number processor cluster elements. By way of example a processor cluster may comprise hundred thousands of processor cluster elements, whereas the number of destination cores may be modest, typically less than 10, e.g. in the range of 1 to 5. Therewith processor clusters in the improved message based multi-processor system require substantially less memory. A modest number of control data elements suffices for the operation of the logic module. These control data elements include at least an offset indication, a destination size indication and a destination core indication.

The destination core indication specifies the address of the destination core. The address may for example be a relative indication, i.e. indicating the coordinates of the destination core in the message exchange network relative to those of the transmitting processor cluster. Alternatively, the address may be provided as an absolute indication. The arrangement of processor clusters in the message exchange network do not need to reflect an organization of the layers in the configured neural network processing system. It is also not necessary that the arrangement of processor clusters in a neural network processor layer imposes restrictions on their arrangement in the message exchange network. Nevertheless it is advantageous if processor clusters of a neural network processor layer are relatively close to processor clusters of a preceding neural network processor layer and/or processor clusters of a succeeding neural network processor layer, so that messages can be transmitted with a minimum amount of hops between network nodes.

Typically the processor cluster elements configured as neural network processing elements are associated with a proper coordinate(s) $(x_1, x_2, \ldots, x_n)$ in an n-dimensional space, wherein n is an integer greater or equal than 1. The processor cluster elements can have a scalar processor ID that is related to its spatial coordinates, by a linear relationship, e.g. as $ID=x_1+N1.x_2+N1.N2.x_3+\Pi i=1, \ldots n-1N_i.x_n$. The coordinates may for example comprise one or more spatial coordinates and one or more feature coordinates. For example a processor cluster element with coordinates $(x_1, x_2, x_3)$ has a position $(x_1, x_2)$ in a two-dimensional space and represents a feature indicated by $x_3$.

In case the processor cluster elements are configured as neural network processing elements in a two-dimensional space, the processor clusters may likewise be arranged in a two-dimensional space. In that case the processor clusters may be identified by their coordinates in that space, but that is not necessary. Alternatively the processor clusters may have a scalar indicator for their identity that is specified in the control data for example. It suffices that the destination core indication uniquely identifies the destination core.

The offset indication can be computed in a preparatory step from the coordinates of the message transmitting processor cluster in the source layer and the message receiving processor cluster in the destination layer. The coordinates of a processor cluster in a layer are understood to mean the coordinates of a reference processor cluster element of the processor cluster in the coordinate system of the layer. The reference processor cluster element is typically the processor cluster element having the lowest coordinate values in the layer's coordinate system. The coordinate value of the processor cluster element representing a neural network layer element of a neural network layer is the vectorial sum of the coordinate value of the processor cluster in the neural network processor layer and the local coordinate value of the processor cluster element in the processor cluster (i.e. relative to the reference processor cluster element)

The destination size indication is representative for the size of the space represented by the core in the destination layer. In case the space is multidimensional, a size in each dimension may be specified in the destination size indication. Alternatively, less control data may be required if it is presumed that the size is equal in two or more of the dimensions.

In the message based multi-processor system it can be determined in a few computationally efficient steps whether or not a message is to be transmitted to a particular destination core.

In a first step, coordinate boundary values are computed based on the local coordinate(s) of the source processor cluster element and the control data elements of the control data for the particular destination core. Lower boundary value(s) are computed by adding the offset value(s) to the local coordinate(s). In case the processor cluster elements are arranged according to a one-dimensional coordinate system, the lower boundary value is equal to the sum of their local coordinate and the offset value. In case the processor cluster elements are arranged according to a higher-dimensional coordinate system, a lower boundary value is computed for each dimension as the sum of the local coordinate for that dimension and the offset value for that dimension. For example for the case with two spatial dimensions [Y,X], the lower boundary values [Ymin, Xmin] are computed as:

$$[Ymin, Xmin] = [Y,X] + [Yoffs, Xoffs]$$

Wherein [Yoffs, Xoffs] is the corresponding pair of offset values in the control data.

Higher boundary value(s), in this example [Ymax, Xmax], are computed by adding thereto a kernel size indicator KC. The kernel size indicator may be related to a size W of a convolution kernel with the following relationship:

$$W = 1 + KC << 1 \text{ or equivalently } KC = (W-1) >> 1$$

Therein the notation "<<k" and ">>k" respectively indicate a binary shift left operation and a binary shift right operation with k positions. I.e. these operations respectively result in a multiplication with $2^k$ and a division by $2^k$.

$$\text{Accordingly } [Ymax, Xmax] = [Ymin, Xmin] + KC$$

Therewith the value of the kernel size indicator can be precomputed with a simple subtraction and a shift right operation. It is presumed that the convolution kernel has a same size in all dimensions. Alternatively, a separate kernel size indicator may be provided for each dimension. In some configurations the kernel size indicator is 0. In that case the size W of the convolution kernel is 1, i.e. the destination processor cluster elements of a source processor cluster element have a common value for their [X,Y] coordinate.

As the final step it is determined whether for each spatial coordinate at least one of the associated lower boundary value and higher boundary value is within the size of the range spanned by the destination core.

Upon confirming that this condition is complied with, the message generator proceeds by preparing and transmitting an output message to the destination processor cluster specified in the control data. The message comprises a coordinate of a processor cluster element in the destination processor cluster. The destination processor cluster applies the message to that processor cluster element only or to a set of processor cluster elements comprising that processor cluster element depending if the kernel size indicator differs from 0.

In some embodiments, the designated processor cluster that is the recipient of the message comprises an enhanced message receiving facility that is capable to apply the event message to a set of processor cluster elements in accordance with a pattern specified by an indicator in the message. The indicator in the message may directly or indirectly refer to the pattern that is to be applied. In embodiments with direct reference, the parameter in the received message is an index in a pattern memory of the recipient processor cluster. In embodiments with indirect reference, the parameter in the received message is an index in a pattern header memory of the recipient processor cluster, which in turn refers to a pattern memory.

In an embodiment, the logic module comprises a respective logic module section to compute for the coordinate values of the processor cluster element associated with the activation signal a potential destination range having minimum and maximum coordinate values for respective coordinates in a coordinate system of the destination processor cluster. In that embodiment, the logic module also comprises a further logic module section to determine whether or not the condition is complied with that for each of the coordinates at least one of the computed minimum value and the computed maximum value is within the corresponding range for that coordinate. The further logic module section is configured to enable a message transmission if the condition is complied with and to disable a message transmission if for any of the coordinates neither the computed minimum value nor the computed maximum value are within the corresponding range.

In practical examples of this embodiment the further logic module section comprises for each coordinate a respective first comparator module to provide a signal indicative that the computed minimum value for that coordinate is in the corresponding range, and a respective second comparator module to provide a first match signal indicative that the computed maximum value for that coordinate is in the corresponding range. It further comprises for each coordinate a logic OR gate to provide a second match signal indicative that at least one first match signal is valid. The further logic module section further comprises a logic AND gate to provide a message transmission enable signal if for each coordinate the further match signal is valid.

In a particular favorable one of these practical examples the comparator module comprises at least one mask register with respective mask bits that each are representative for a respective power of 2 and respective logic gates for bitwise comparison with a corresponding bit of a computed minimum value or maximum value as well as a combination module to issue an invalid match signal if at least one of the logic gates indicates that a bit of a computed minimum/maxim value is set while the corresponding mask bit is not set. In this latter exemplary embodiment partitions can be defined according to powers of 2. If the tested minimum or maximum value exceeds the specified power of 2, for which the mask bit is not set, the corresponding logic gate issues an output signal causing the combination module to issue an invalid match signal. The bitwise comparison allows for a very small delay and a modest silicon area as compared to an embodiment using a full comparator.

BRIEF DESCRIPTION OF THE DRAWINGS

These and other aspects of the present disclosure are shown in more detail in the attached drawings. Therein:

FIG. 10 shows aspects of a configuration for a convolution without padding;

FIG. 12A, 12B shows aspects of a configuration for concatenating independent feature maps into one larger feature map in a next layer;

DETAILED DESCRIPTION OF EMBODIMENTS

Figure 1:
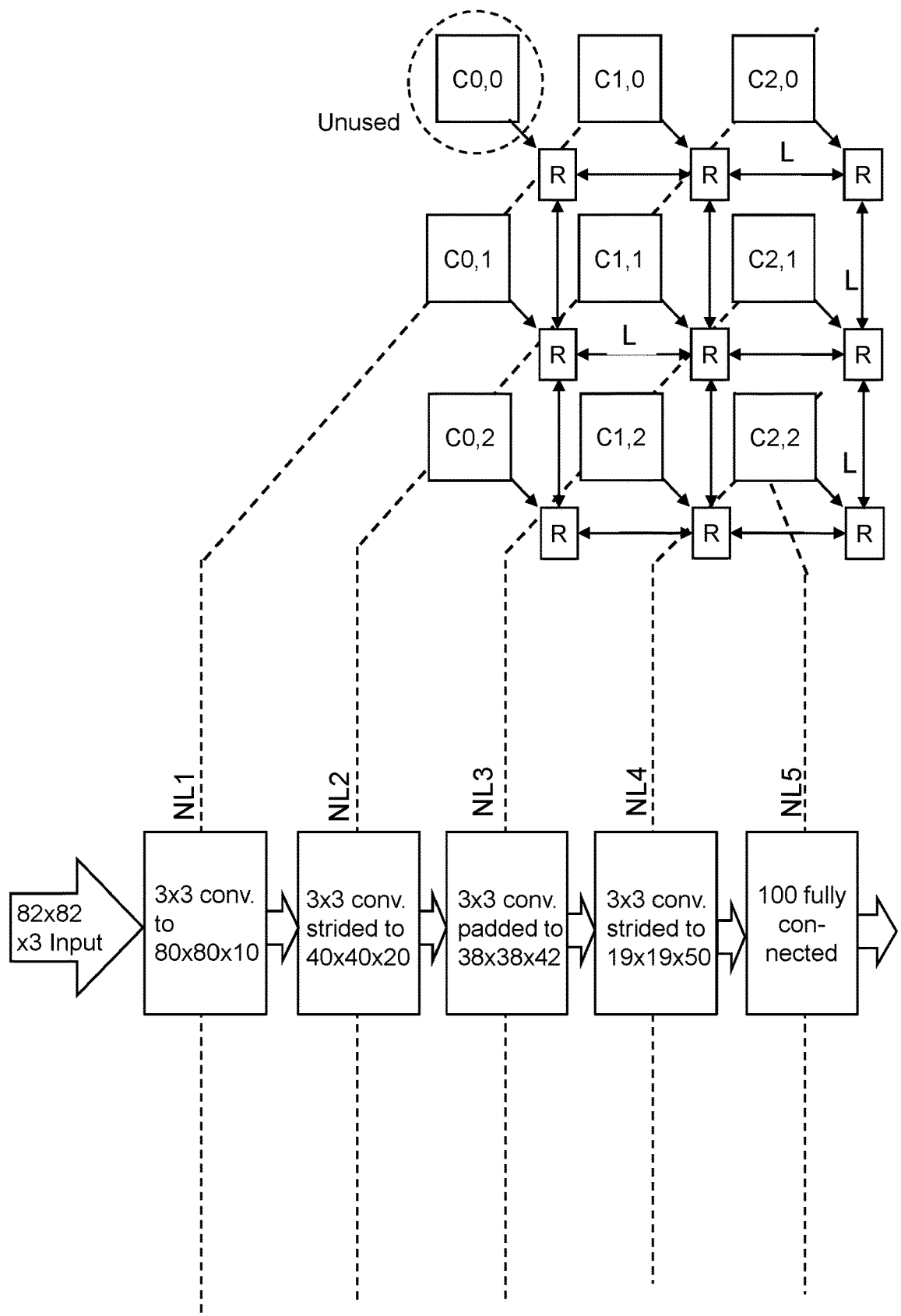
FIG. 1 schematically shows an exemplary embodiment of the improved message based multi-processor system that is configured as a neural network processor. Therein the top part of FIG. 1 shows the elements of the improved message based multi-processor system and the bottom part shows the neural network processor configured therewith.

The upper part of FIG. 1 schematically shows a message based multi-processor system 1 comprising a message exchange network with routers R and links L and a plurality of processor clusters Ci,j capable to mutually exchange messages via the message exchange network. As shown in more detail in FIG. 2, a processor cluster Ci,j comprises one or more processor cluster elements PCE, and a message generator MG.

The message based multiprocessor system 1 is configurable as a neural network processor system having a plurality of neural network processing layers each being assigned one or more of the processor clusters with their associated processor cluster elements being neural network processing elements therein. By way of illustrative example it is shown in the lower in FIG. 1 how the exemplary message based multi-processor system 1 is configured as a neural network processor system having five neural network processing layers NL1, NL2, NL3, NL4, NL5. The neural network processor system configured in this manner has a 82×82×3 data input, e.g. for providing RGB image data with a resolution of 82×82 pixels. The neural network processing layers NL1, NL2, NL3, NL4 are each 3×3 convolutional layers.

The first convolutional neural network processing layer NL1 is a convolutional layer with 10 feature maps with a resolution of 80×80 pixels and is assigned to the processor clusters C1,0 and C0,1. The second convolutional neural network processing layer NL2 has 20 feature maps with a resolution of 40×40 pixels and is assigned to the processor clusters C2,0, C1,1 and C2,0. The third convolutional neural network processing layer NL3 has 42 feature maps with a resolution of 38×38 pixels and is assigned to the processor clusters C2,1 and C1,2. The fourth convolutional neural network processing layer NL4 has 50 feature maps with a resolution of 19×19 pixels and the fifth neural network processing layer NL5 is a fully connected layer. The neural network processing layers NL4, NL5 are both assigned to processor cluster C2,2. It is noted that the processor cluster C0,0 is not used to configure the neural network processor system and may be used for other purposes.

It will be appreciated that this is merely a simplified example. In practice a core may include thousands of processor cluster elements and the message based multiprocessor system may include hundreds or more of such cores arranged in the message exchange network. Also it is not necessary that there is such a clear geometrical relationship between the position of the cores in the message based processor system and their assignment to neural network processing layers.

Figure 2:
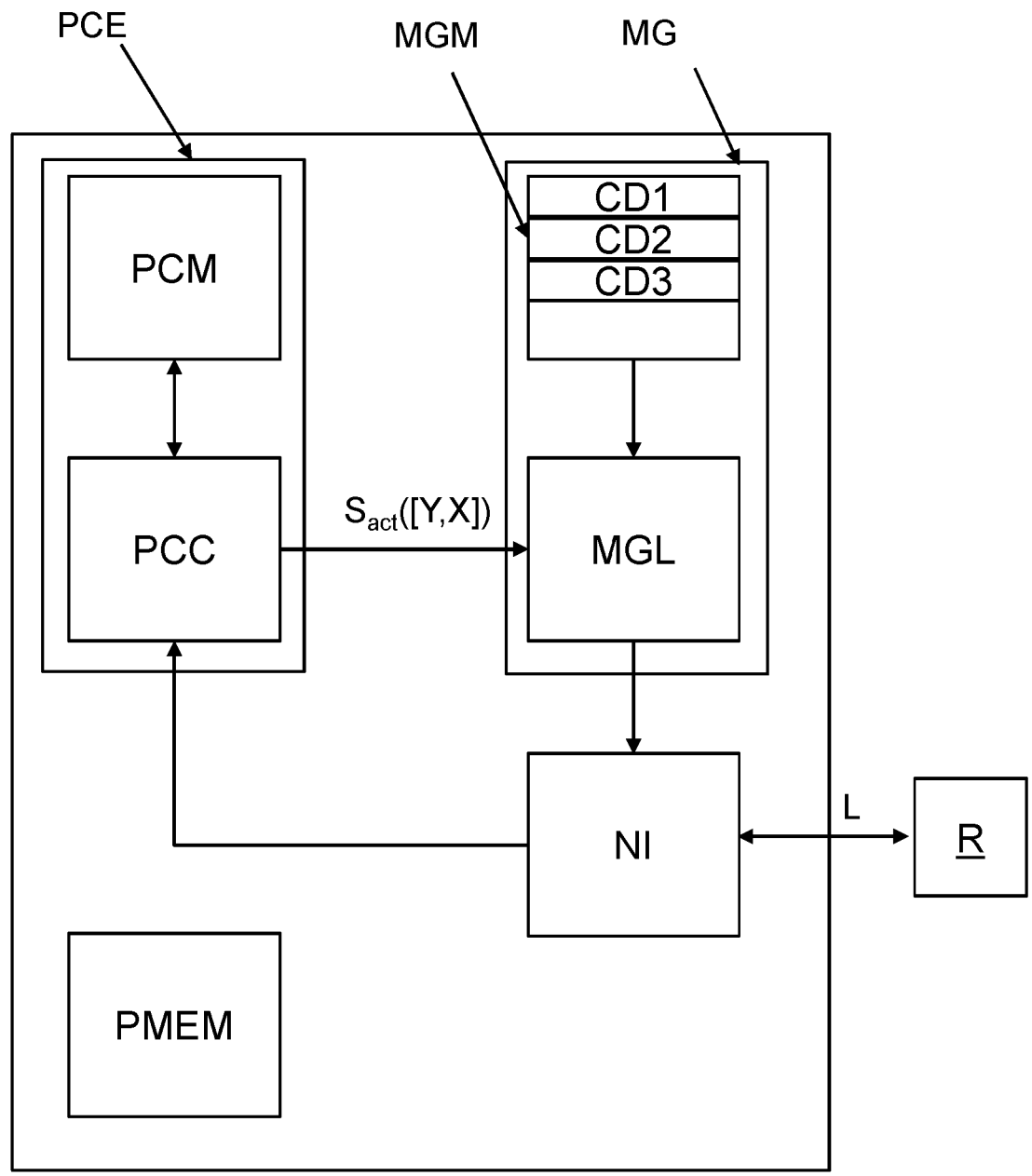
FIG. 2 shows an exemplary processor cluster in an embodiment of the improved message based multi-processor system.

In FIG. 2 it is shown that the message generator MG of a processor cluster Ci,j comprises a logic module MGL and an associated message generator control storage space MGM. The logic module MGL of a message generator is configured to respond to an activation signal $S_{act}([X,Y])$ of a processor cluster element. In response to an activation signal $S_{act}([X,Y])$ it selectively generates and transmits a message for each of a set of destination processor clusters in accordance with respective message generation control data CD1, CD2, CD3 for the destination processor clusters stored in the message generator control storage space MGM (note that in this case there are three control data words, as the destination feature map is cut over three cores, that are all reachable by the source feature map cut). In this connection, a destination processor cluster of a processor cluster is a core that is configured to potentially receive messages from that processor cluster. In the example of FIG. 1, processor cluster C0,0 has two destination cores i.e. core C0,1, and C1,0, and processor cluster C0,2 has no destination core. Also processor cluster C2,2 being assigned to the last neural network processor layer NL5 has no destination core. The other processor clusters have exactly one destination core.

Figure 3:
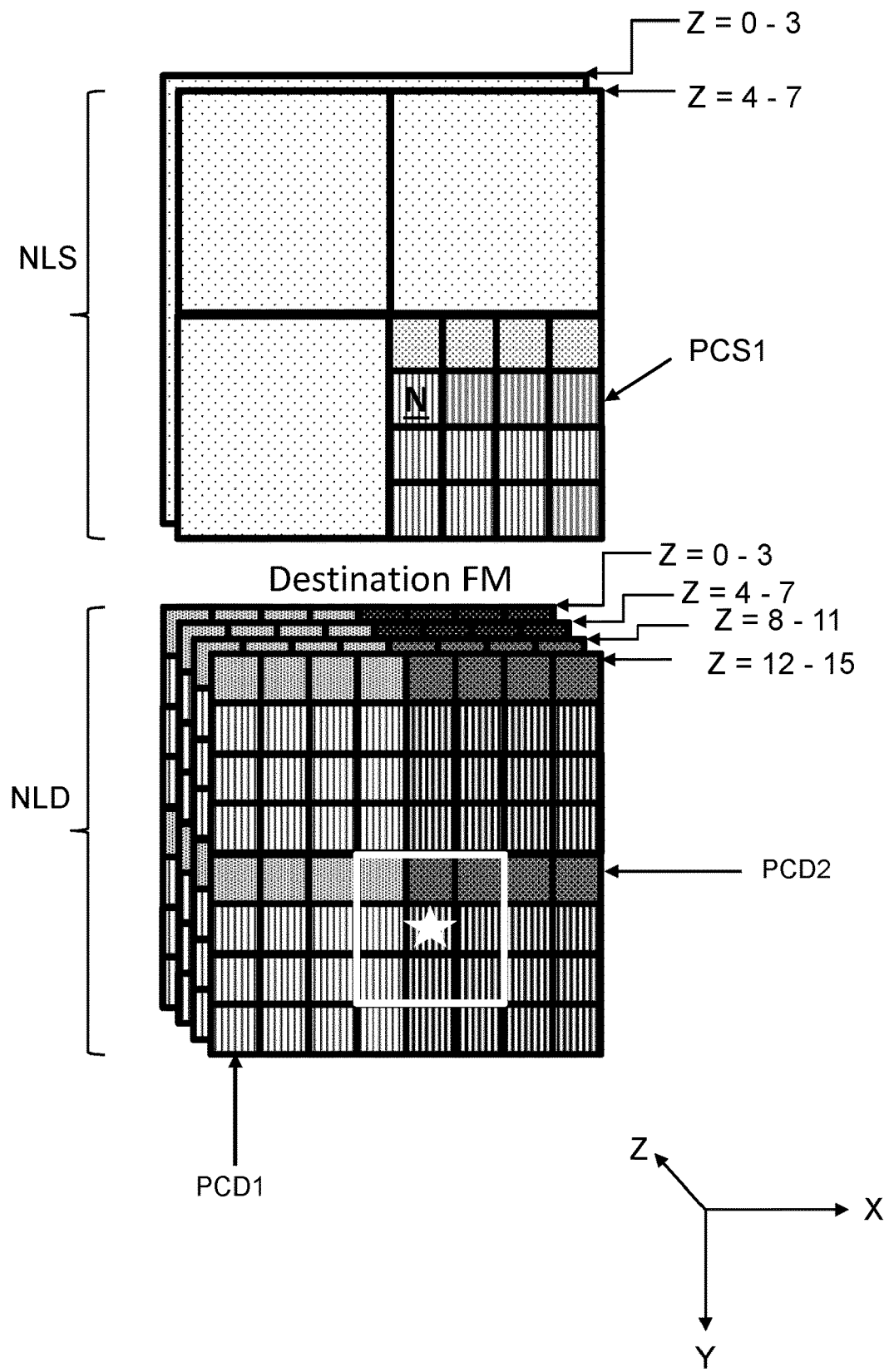
FIG. 3 shows another example illustrating an assignment of processor clusters with their associated processor cluster elements to neural network processing elements in neural network layers.

FIG. 3 shows another example illustrating an assignment of processor clusters with their associated processor cluster elements to neural network processing elements in neural network layers. Therein the upper part of FIG. 3 shows an exemplary neural network layer NLS of a neural network and the lower part of FIG. 3 shows another neural network layer NLD of the neural network, that is the destination of the first mentioned neural network layer. For this purpose, the neural network layer NLS in the upper part of FIG. 3 will be denoted as "source neural network layer" and the neural network layer NLD in the lower part of FIG. 4 will be denoted as "destination neural network layer". In the embodiment shown, the neural network layers NLS, NLD each have feature maps. Each feature map specifies a distribution of a feature value in a feature space. In this case the space is two-dimensional, having coordinates (X,Y) and each feature map has a proper coordinate Z. In other embodiments feature maps may be provided in a one-dimensional space, or alternatively in a space with a dimension higher than 2. In the embodiment shown the source neural network layer NLS has eight feature maps with Z=0, 1, . . . , 7 respectively. The destination neural network layer NLD has 16 feature maps with Z=0, 1, . . . 15. Each of the feature maps has a coordinate range extending from (X,Y)=(0,0) to (7,7). In the example shown, the coordinate ranges (4,4) to (7,7) for the feature-maps 4-7 of the source neural network layer NLS are assigned to a processor cluster PCS1. The other coordinate ranges are assigned to other processor clusters.

The processor cluster PCS1 assigned to this range has destinations in the destination feature map assigned to:
 a first destination processor cluster PCD1 for the range (Xdst0, Ydst0, Zdst0)=(0, 0, 0) to (3, 7, 15)
 second destination processor cluster PCD2 for the range (Xdst0, Ydst0, Zdst0)=(4, 0, 0) to (7, 7, 7)
 a third destination processor cluster PCD3 for the range (Xdst0, Ydst0, Zdst0)=(4,0, 8) to (7, 7, 15).

In the following it is described in more detail, how the source processor cluster PCS selectively generates and transmits a message to each of these destination processor clusters PCD1, PCD2, PCD3, based on an evaluation using the respective message generation control data (CD1, CD2, CD3) stored in its message generator control storage space MGM.

Starting with the first of the destination processor clusters PCD1, the evaluation is as follows.

Out of the ID of the processor cluster element responsible for the activation signal Sact[X,Y], further denoted herein also as "firing processor cluster element" or simply "firing core element" the (X, Y) location relative to the origin of the feature map is calculated. In this example, the activation signal Sact[X,Y] specifies that the local coordinates of the firing core element within the cluster PCS are X=0, Y=1.

Adding to these coordinates the coordinates of the origin (Xsrc0=4, Ysrc0=4) of the source processor cluster PCS in the global coordinate system provides the global coordinates (Xsrc, Ysrc) of the firing core element in the complete logical source feature map.

$$X_{src}=X+X_{src0} Y_{src}=Y+Y_{src0}$$

The coordinates of the origin of the destination core PCD1 in the global coordinate system are subtracted from this intermediary result. For destination core PSD1 the global coordinates of its origin are (Xdst0=0, Ydst0=0).

Then an offset (ΔXmin, ΔYmin) is subtracted to get the first destination (X,Y) affected by the firing core element (in the example of a zero-padded 3×3 convolution the kernel size (Kernel Size) is 3 and the value to be subtracted is (KernelSize−1)/2=1), presuming that the kernel is a square. Alternatively the kernel shape is rectangular and can be specified with a pair of kernel sizes.

Instead of repeating all computations each time an activation signal is received, the computation is simplified by precomputing an offset pair $$X\text{offs}=X\text{src0}-X\text{dst0}-\Delta X\text{min}$$

$$Y\text{offs}=Y\text{src0}-Y\text{dst0}-\Delta Y\text{min}$$

The values of the pre-computed offset pair are stored as part of the message generation control data (CD1, CD2, CD3).

Upon receipt of an activation signal Sact[X,Y], a minimum coordinate pair is computed by adding the offset value pair (Xoffs, Yoffs) to the coordinate pair (X,Y) provided by the activation signal:

$$(X\text{min},Y\text{min})=(X,Y)+(X\text{offs},Y\text{offs}),$$

Therein Xmin, Ymin are the minimum X-value and the minimum Y-value respectively.

Also a maximum coordinate pair is computed by adding the kernel size indicator to the minimum coordinate pair. I.e.

$$(X\text{max},Y\text{max})=(X\text{min},Y\text{min})+(Kx,Ky)(=(X\text{min},Y\text{min})+(K,K) \text{ for a rectangular kernel}).$$

Therein Xmax, Ymax are the maximum X-value and the maximum Y-value respectively. Furthermore:
 K=KernelSize−1, or in the more general case:
 Kx=KernelSizeX
 Ky=KernelSizeY Subsequently, it is determined by the logic module MGL of the processor whether or not an output message is sent to the destination processor cluster PSD1 in response to the activation signal Sact[X,Y].

To that end the values of the minimum coordinate pair (Xmin, Ymin) and the values of the maximum coordinate pair are compared with the dimensions of the range spanned by the destination processor cluster PSD1 in the coordinate space. These are denoted as W in the X-direction and H in the Y-direction. Transmission of an output message is enabled if at least one of the values Xmin, Xmax is within the range [0,W) and at least one of the values Ymin, Ymax is within the range [0,H).

With these steps, at most one message needs to be send to each destination cluster or feature map in a destination cluster. The message needs only to specify a single destination coordinate and the destination cluster applies the message to a set of destination processor cluster elements specified by a pattern. An identification of the pattern to be applied is typically included in the message. For the destination processor cluster PCD1 the offset value pair is (Xoffs=3, Yoffs=3). In this example, wherein the activation signal Sact[X,Y] originates from the firing core element with local coordinates X=0, Y=1, the minimum coordinate pair and the maximum value pair are computed as:

$$(X\text{min},Y\text{min})=(0,1)+(3,3)=(3,4)$$

$$(X\text{max},Y\text{max})=(3,4)+(2,2)=(5,6)$$

The message generation control data (CD1) of the processor cluster (PCS1) specifies that the destination processor cluster (PCD1) has a width W=4 and a height 11=8. Accordingly at least one of the values Xmin, Xmax, here the value Xmin=3, is within the range [0,W). Also at least one of the values Ymin, Ymax, in this case both values Ymin=4, Ymax=6, is within the range [0,H). Therewith the logic module (MGL) determines that a message is to be generated and transmitted to destination processor cluster PCD1.

The message to be generated and transmitted may comprise the following data:
a) The cluster address specified in the message generation control data (CD1) and the value pair (Xmin, Ymin) computed with the logic module (MGL).
b) In exemplary embodiments the message includes a value. This is not essential. In some cases the presence or absence of a message may be considered as indicating a Boolean value. Also the distance in time between subsequent messages may indicate a value to the recipient processor cluster (PCS1).
c) In exemplary embodiments, the message alternatively or additionally comprises a pattern identification. The pattern identification enables the destination processor cluster (PCS1) to select one of a plurality of patterns of weight values to be applied to its processor cluster elements to which the message is to be applied. Alternatively, the destination processor cluster (PCS1) may apply a standard pattern. A pattern identification may be determined as the sum of a base ID (PatternID0) and a coordinate value Z indicating a feature map index associated with the processor cluster element processor cluster element (PCE) in the processor cluster (PCS1) that is responsible for the activation signal. The receiving destination processor cluster (PCD1) applies the message value in accordance with the weights of the pattern to its processor cluster elements (PCE). Therein the message value is either a value explicitly specified in the message or a value implicit from the presence or absence of the message or the amount of time passed since a previous message and the pattern is either a default pattern or a pattern specified by a pattern identification in the message.

For destination core PSD2 the global coordinates of its origin are (Xdst0=4, Ydst0=0). Accordingly, the offset value pair for this destination core (PSD2) is pre-computed as $$X\text{offs}=X\text{src0}-X\text{dst0}-\Delta X\text{min}=4-4-1=-1$$

$$Y\text{offs}=Y\text{src0}-Y\text{dst0}-\Delta Y\text{min}=4-0-1=3$$

In this example, wherein the activation signal Sact[X,Y] originates from the firing core element with local coordinates X=0, Y=1, the minimum coordinate pair and the maximum value pair are computed as:

$$(X\text{min},Y\text{min})=(0,1)+(-1,3)=(-1,4)$$

$$(X\text{max},Y\text{max})=(-1,4)+(2,2)=(1,6)$$

The message generation control data (CD2) of the processor cluster (PCS2) further specifies that the destination processor cluster (PGD2) has a width W=4 and a height H=8. Accordingly at least one of the values Xmin, Xmax, here the value Xmax=1, is within the range [0,W). Also at least one of the values Ymin, Ymax, in this case both values Ymin=4, Ymax=6, is within the range [0,H). Therewith the logic module (MGL) determines that a message is to be generated and transmitted to destination processor cluster PCD2.

The message generation control data (CD3) pertains to a third processor cluster (PCD3) that has the same global coordinates of its origin (Xdst0=4, Ydst0=0) in the XY-plane as the processor cluster PCD2, but having a different Z-value, i.e. Zdst=8. This implies that a message, if transmitted, to the third destination processor cluster (PCD3) will have a pattern ID different from that of the second destination processor cluster (PCD3).

Figure 4:
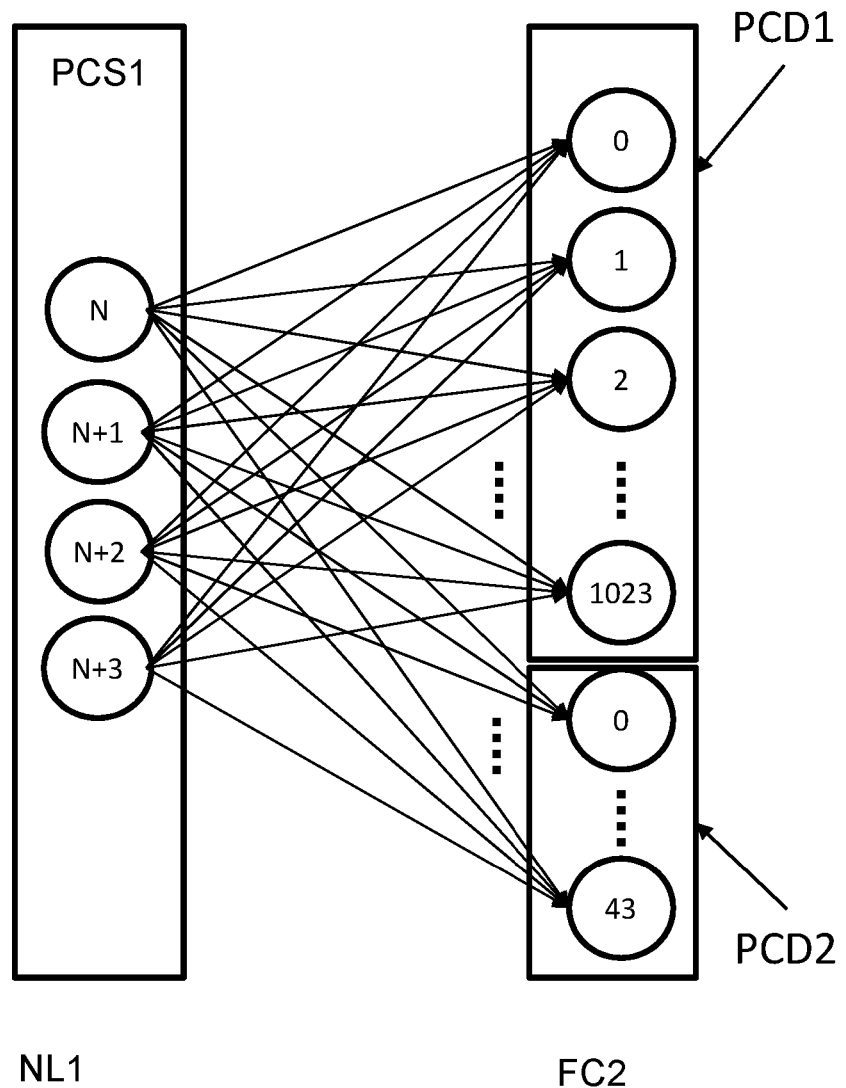
FIG. 4 shows another example of an assignment of processor clusters with their associated processor cluster elements to neural network processing elements in neural network layers.

FIG. 4 shows another example, wherein the neural network processor system that is configured by the message based multiprocessor system 1 comprises a fully connected neural network processing layer FC2. I.e. the layer FC2 is fully connected to the neural network processing layer NL1. In the example shown in FIG. 4, the neural network processing layer NL1 is configured by a processor cluster PCS1 and a further source processor cluster, not shown here. The fully connected neural network processing layer FC2 is configured by a destination processor cluster PCD1 and a destination processor cluster PCD2.

The fully connected layer FC2 provides for a mapping 1×1×Z1→1×1×Z2 (where Z1 and Z2 are the layer depth of the source NL1 and the destination layer FC2 respectively). This mapping is logically equivalent to 1×1 convolution on a feature map with X and Y equal to 1.

Source-FM is of size (1, 1, 1024). In the example shown, the coordinate range of the neural network processing layer NL1 is (Xsrc0, Ysrc0, Zsrc0)=(0, 0, 0) to (0, 0, 1023). In this example the processor cluster PCS1 is assigned to the partition (Xsrc0, Ysrc0, Zsrc0)=(0, 0, 512) to (0, 0, 1023) of this coordinate range. The destination processor cluster PCD1 and the destination processor cluster PCD2 are respectively assigned to the partitions:

(Xdst0, Ydst0, Zdst0)=(0, 0, 0) to (0, 0, 1023) and
(Xdst0, Ydst0, Zdst0)=(0, 0, 1024) to (0, 0, 1067) in the coordinate range of fully connected neural network processing layer FC2.

By way of example, it is presumed that a neural network processor element identified by coordinates (X,Y,Z)=(0,0,N), (i.e., NeuronID=FMstart+N) gives rise to an activation signal. It is further presumed in this example that a range of PatternIDs in destination processor cluster PCD1 extends from 0 (source Neuron 0) to 1067 (source Neuron 1067) and that a range of PatternIDs in Cluster PGD2 extends from 99 (source Neuron 0) to 1166 (source Neuron 1067)

| message generation control data | CD1 | CD2 |
| --- | --- | --- |
| PatternID0 | 512 | 611 |
| Xoffs | 0 | 0 |
| Yoffs | 0 | 0 |
| KC | 0 | 0 |
| address | Address of PCD1 | Address of PCD2 |
| W | 1 | 1 |
| H | 1 | 1 |

Upon detection of the activation signal Sact(0,0,N), the logic module MGL of the processor cluster PCS1 computes the minimum and the maximum value pair [Xmin, Ymin] and [Xmax, Ymax] using the coordinates of the processor cluster element PCE in the XY plane. As the XY coordinates are (0,0) and the offset values as well as the KC-value are 0, the computed values of the minimum pair and the maximum pair are $$[X\text{min},Y\text{min}]=[0,0]$$

$$[X\text{max},Y\text{max}]=[0,0]$$

Accordingly at least one of the values Xmin, Xmax, in this case both, is within the range [0,W). Also at least one of the values Ymin, Ymax, in this case both, are within the range [0,H), Since for fully connected layers Xmin, Xmax, Ymin, and Ymax are always zero (as Xsrc, Ysrc, Xdst, Ydst are always 1 while KernselSize is always 1—that means that the x,y of a firing neuron is always 0 while the Xoffset, Yofsset is always 0. The message transmitted to the destination processor cluster PCD1 comprises the following data (Address of PCD1, Xmin=0, Ymin=0, PatternID=PatternID0+N=512+N, Value).

The above applies equivalently to the enablement of a message to the destination processor cluster PCD2 albeit that the destination address and the selected pattern are different. I.e. the message transmitted for destination processor cluster PCD2 comprises the following data (Address of PCD2, Xmin=0, Ymin=0, PatternID=PatternID0+N=611+N, Value).

Figure 5:
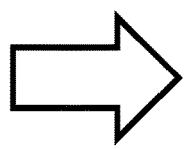
FIG. 5 shows an example wherein subsequent to a convolution C1 a subsampling S2 in X and Y by factor of two is performed to reduce the XY dimension of a feature map.
Figure 5:
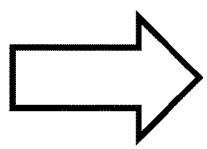

FIG. 5 shows an example wherein subsequent to a convolution C1 a subsampling S2 in X and Y by factor of two is performed to reduce the XY dimension of a feature map. This is logically the same as jumping by two in the input-kernel sliding (commonly referred to as striding). The operations convolution and sub-sampling can be merged to reduce the number of processor cluster elements PCE required to be configured as neural processing layer elements. Therewith the required number X of processor cluster elements PCE can be reduced by 75%. Effectively, only those processor cluster elements corresponding to neural elements with even X and Y coordinate need to remain.

As illustrated in FIG. 5A-5D, the following four cases may occur for the minimum pair [Xmin, Ymin] relating to the affected regions.

Figure 5A:
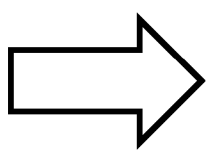
FIG. 5A-5D shows various conditions relevant to FIG. 5.
Figure 5B:
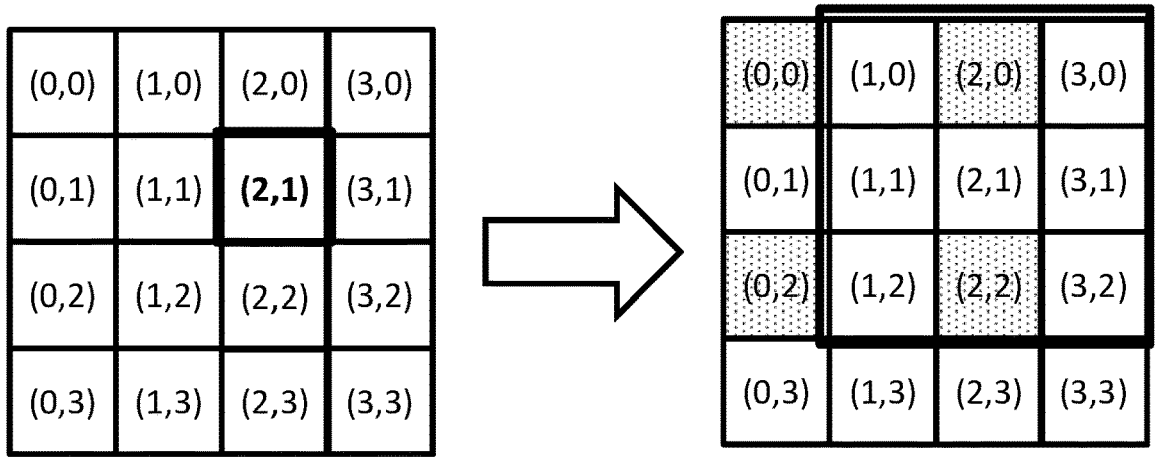
Figure 5C:
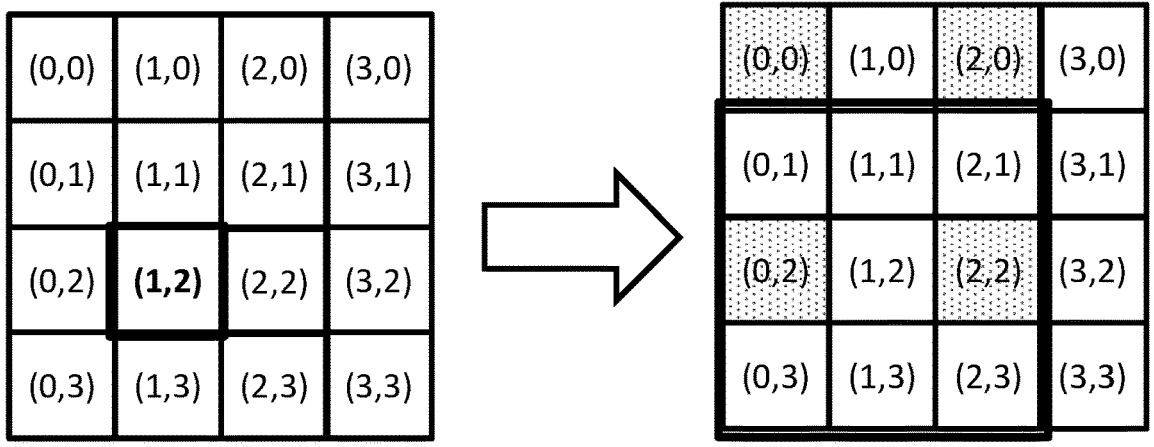
Figure 5D:
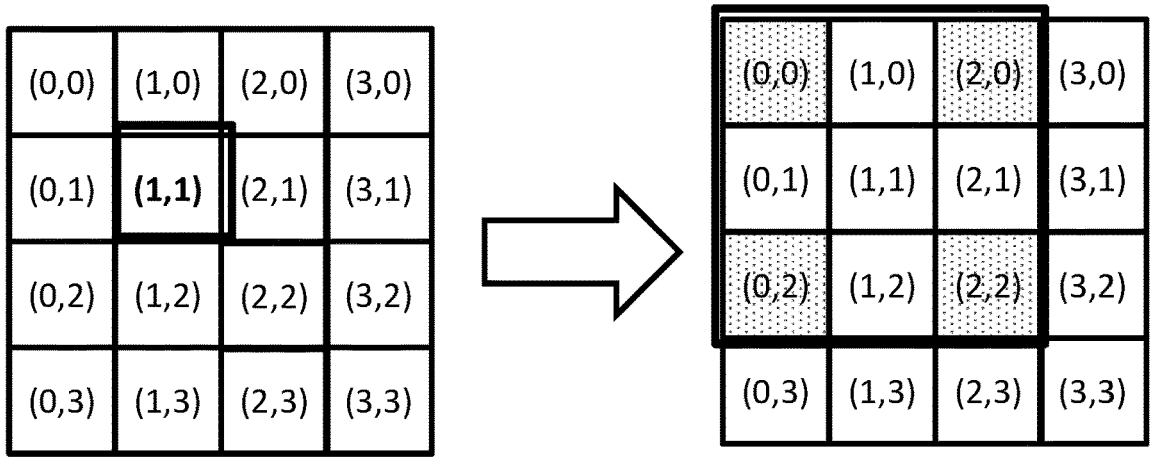

Both Xmin and Ymin are odd (FIG. 5A)
Xmin is odd, Ymin is even (FIG. 5B)
Xmin is even, Ymin is odd (FIG. 5C)
Both Xmin and Ymin are even (FIG. 5D)

In the first case, shown in FIG. 5A, the operation becomes a convolution with a kernel of size KH×KH, wherein KH is related to the size of the kernel (KernelSize) of the convolution C1 as follows:

$$KH=(KernelSize-1)>>1)$$

This is for example a 1×1 cony with w(0,0), wherein w (.,.) indicates the weights of the convolution kernel C1, i.e. w(0,0) is the weight of the convolution kernel C1 for the coordinates (0,0).

In the second case, as shown in FIG. 5B, the combined operation is equivalent to a convolution with KH×(KH+1) In this example a 1×2 cony with [w(0,-1); w(0, 1)].

In the third case, shown in FIG. 5C, the combined operation reduces to a convolution with (KH+1)×KH, in this example a 2×1 convolution with [w(-1,0); w(1,0)].

In the fourth case, shown in FIG. 5D, the combined operation is equivalent to a convolution with (KH+1)×(KH+1). In this example a 2×2 convolution with [w(-1,-1); w(1,-1); w(-1,1); w(1,1)]

This example considers a typically odd kernel width/height, but it is the same for an even kernel shape. In that case, only the shape for the four sub-convolutions changes.

Figure 6:
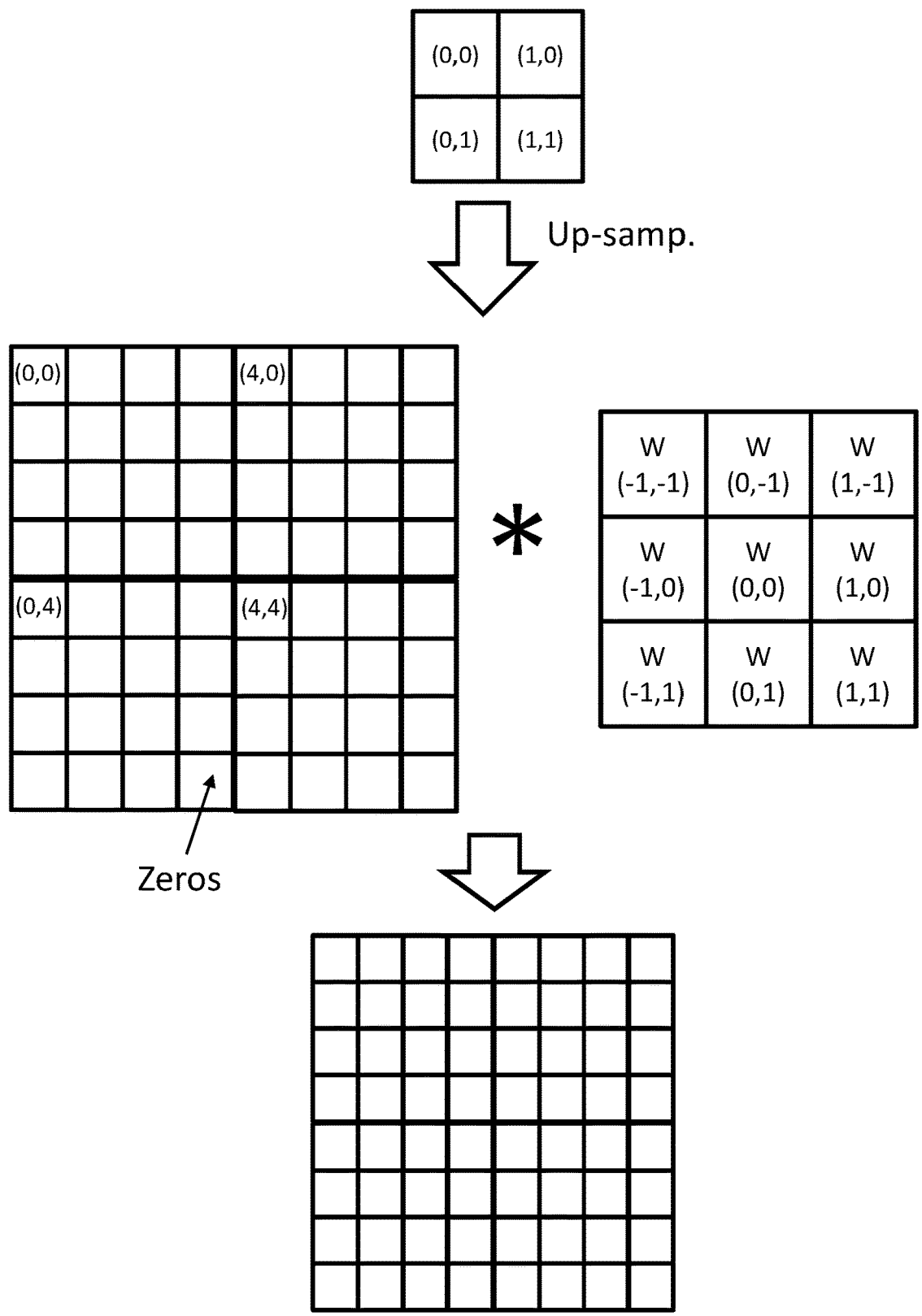
FIG. 6 shows an example, wherein the operation is an upsampling (i.e. adding zeros) to be performed before applying a convolution.

FIG. 6 shows a still further example, wherein the operation is an upsampling (i.e. adding zeros) to be performed before applying a convolution. Up-sampling can be by a factor of 2, 4, 8, 16 . . . (while down-sampling is a factor 2 always). The improved message based multi-processor system 1 facilitates merging the upsampling operation and the subsequent convolution operation in a single convolution layer as will be set out in more detail below. In the example shown, the first operation is an Up-Sampling with a factor 4 and the second operation is a 3×3 convolution (zero-padded).

Figure 7A:
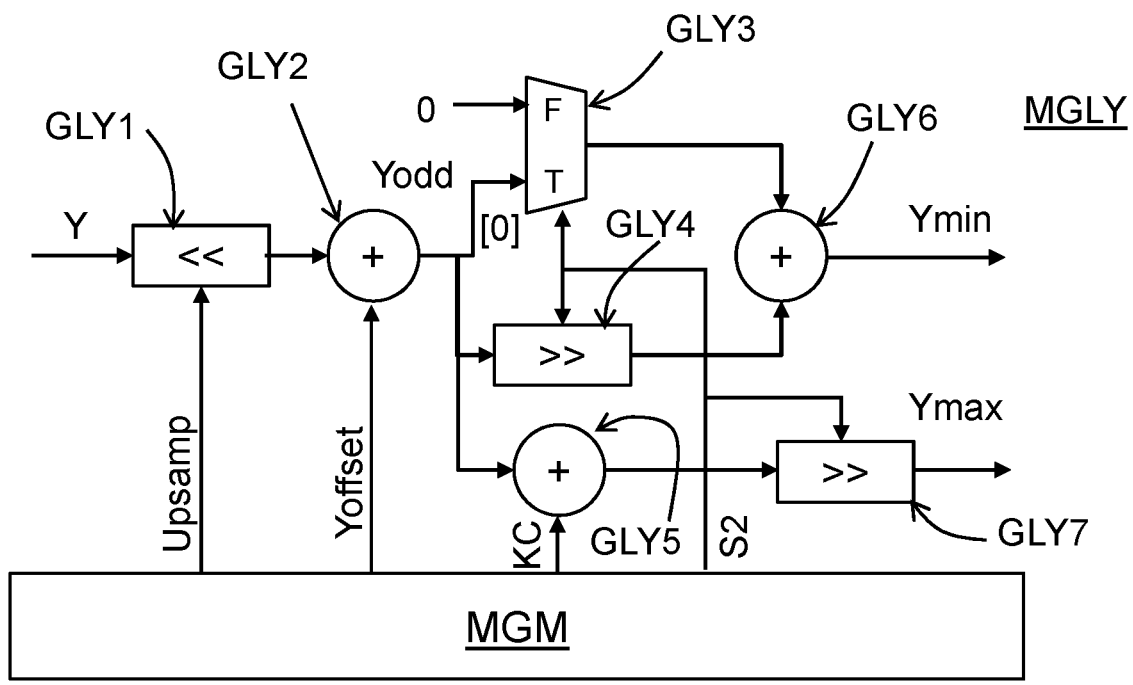
FIG. 7A-7E shows various aspects of a component of a processor cluster in more detail.

Effectively, Neuron X,Y will be shifted left (i.e., multiplied by two) before applying inverse convolution FIG. 7A-7E shows aspects of a message generator MG in more detail. Therein FIG. 7A shows a first module MGLY that computes the minimum and maximum Y-values (Ymin, Ymax) based on the Y-value of the processor cluster element PCE from which the activation signal (Sact([X,Y])) originates.

Figure 7B:
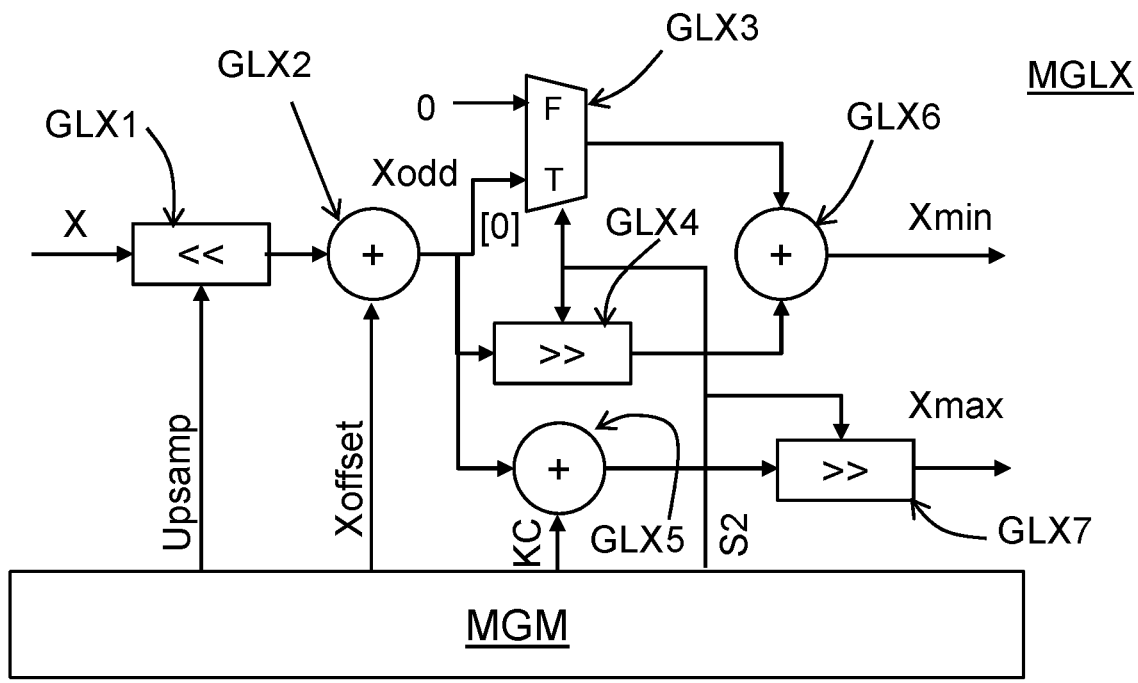

FIG. 7B shows a second module MGLX that computes the minimum and maximum X-values (Xmin, Xmax) based on the X-value of that processor cluster element PCE.

Figure 7C:
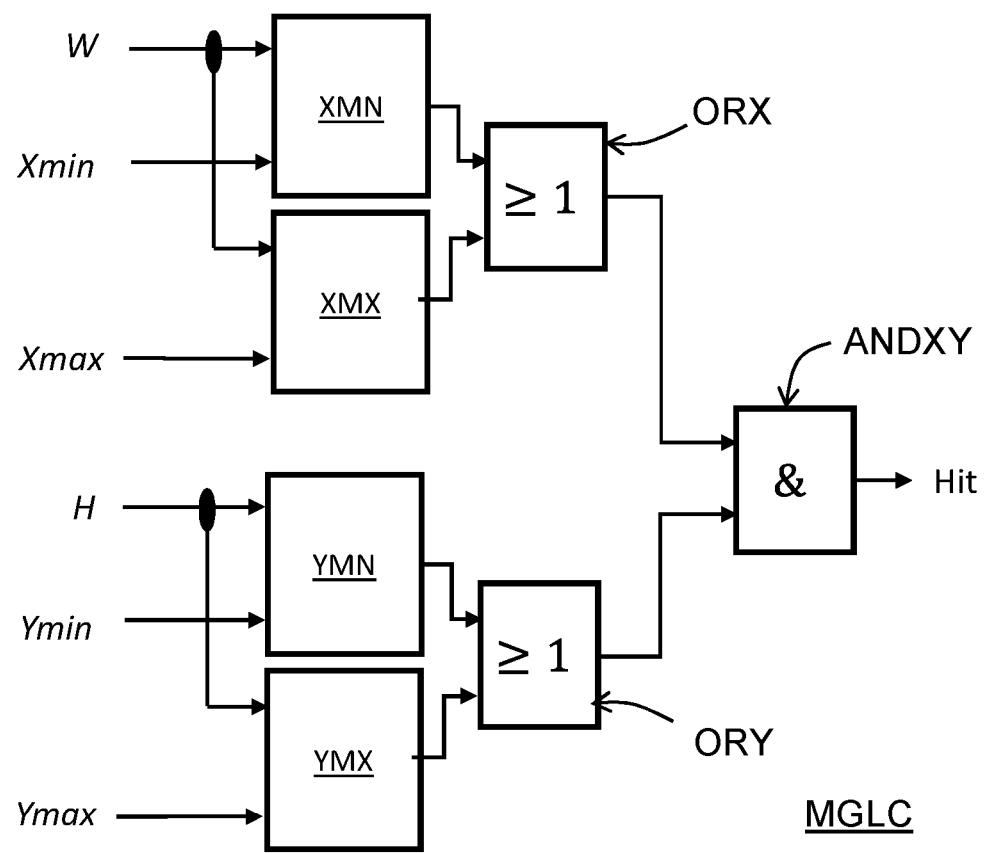

FIG. 7C shows a third module MGLC that determines the pattern ID to be send with the message.

Figure 7D:
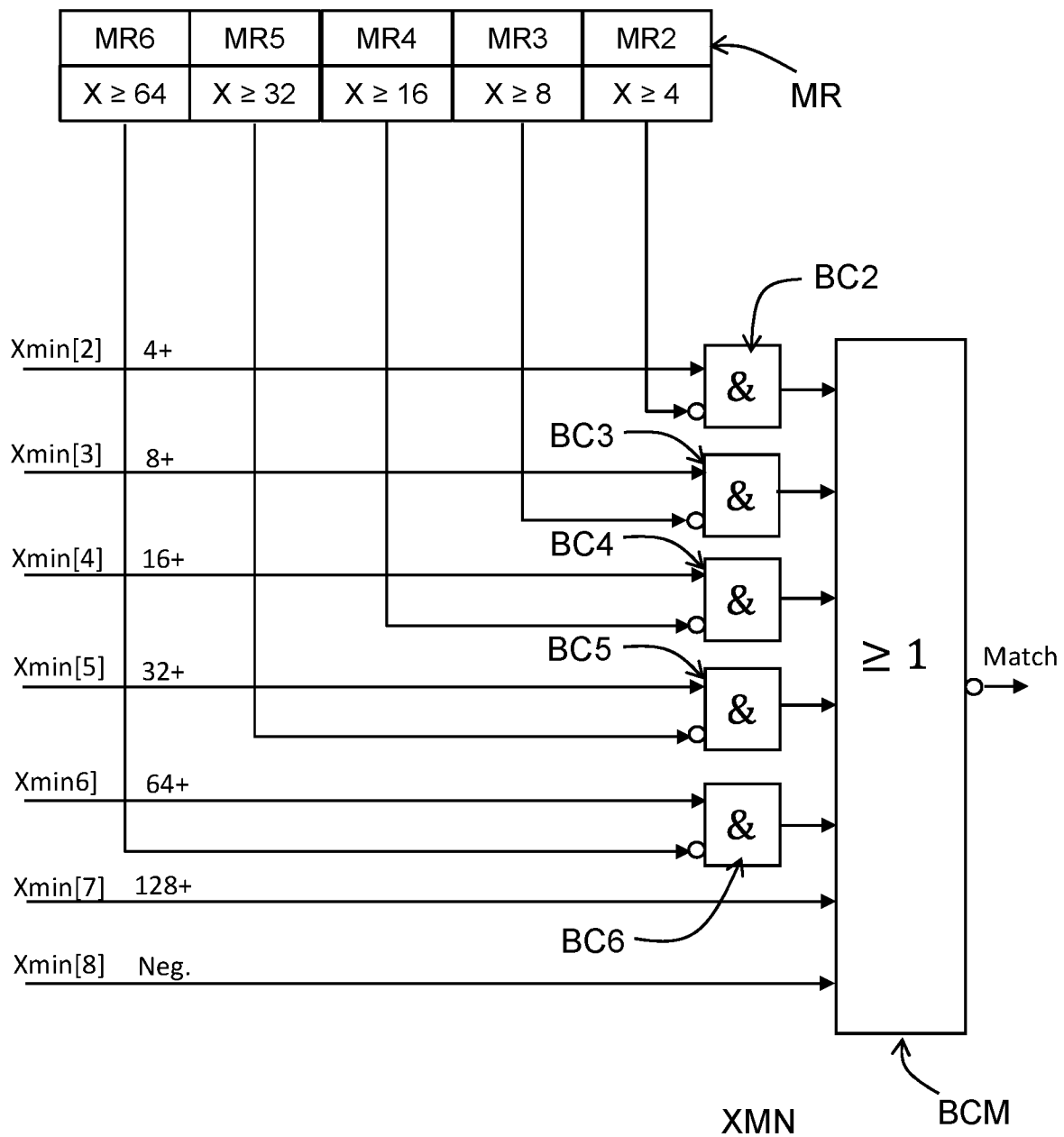

FIG. 7D shows an exemplary implementation of a part XMN in the third module MGLC.

Figure 7E:
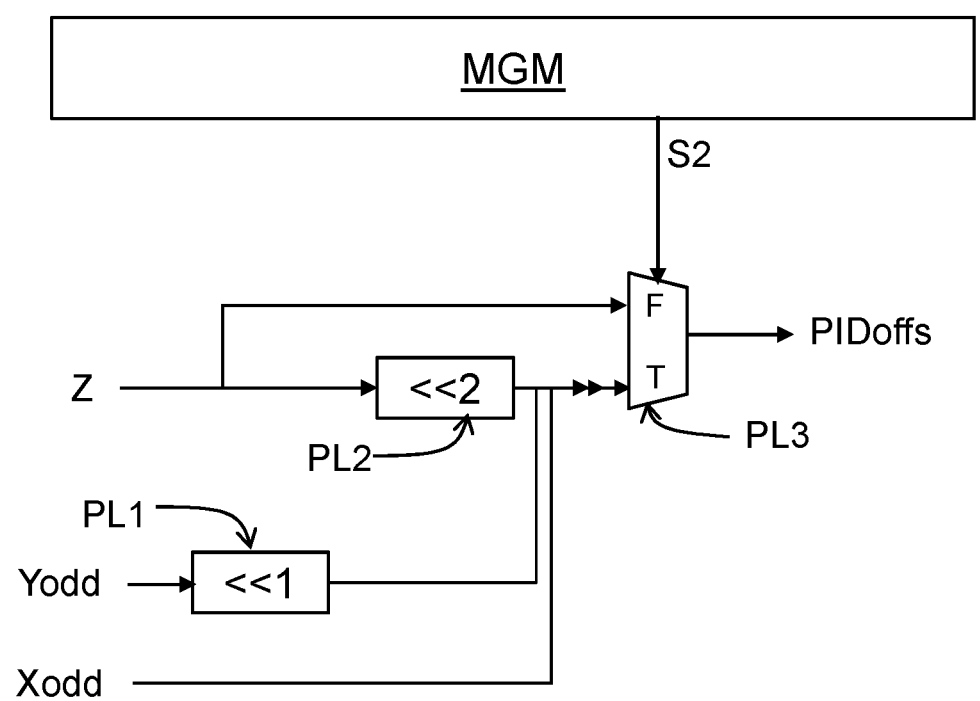

FIG. 7E shows a fourth module that determines whether or not a message is to be send.

As becomes apparent from these figures, the logic module MGL determines whether or not a message is to be send to a particular destination processor cluster in a computationally efficient manner.

For illustration purposes, FIG. 7A-7E show the respective modules as a pseudo-hardware implementation. It will be appreciated by the skilled person that the same operations may be performed by one or more programmable processors.

More in particular the first module shown in FIG. 7A performs the following operations.

In FIG. 7A the Y-value indicated in the activation signal is optionally left-shifted in element GLY1 by a factor indicated by the parameter Upsamp contained in the message generation control data CD1, CD2, . . . . Therewith the number of bits with which the left-shift operation is applied is equal to 2 Log (UpsamplingFactor). It is presumed that only upsampling by a power of 2 is required. If no upsampling is required the input value of Y is passed to the output of element GLY1. It may be contemplated to provide for upsampling factors other than powers of 2. In that case the shift-left operation should be replaced by a multiplier, which is computationally more expensive. In adder GLY2 a Yoffset is added to the output value Y<<Upsamp from element GLY2. The output of adder GLY2 is supplied to shift-right element GLY4 and adder GLY5. Furthermore the first bit (Yodd) of this output is supplied to multiplexer GLY3.

In operation, the logic module performs the following steps Initial lower boundary values [Ymin, Xmin] for the mapping window are computed as:

$Y\text{min}=Y<<CDi.\text{UpSamp}+CDi.\text{Yoffset}$ (See FIG. 7A, elements GLY1 and GLY2 respectively)

$X\text{min}=X<<CDi.\text{UpSamp}+CDi.\text{Xoffset}$ (See FIG. 7B, elements GLX1 and GLX2 respectively)

Therein CDi.x denotes the parameter x in the message generation control data CDi stored in the message generator control storage space (MGM), wherein "i" is the index associated with the current destination processor cluster. For example CD1.UpSamp is the upsampling factor for the destination processor cluster with index 1.

In elements GLY1,GLX1 the Y-value and X-value indicated in the activation signal are optionally left-shifted by a factor indicated by the parameter CDi.Upsamp contained in the message generation control data CDi. Therewith the number of bits with which the left-shift operation is applied is equal to 2 Log (UpsamplingFactor). It is presumed that only upsampling by a power of 2 is required. If no upsampling is required the input value of Y is passed to the output of elements GLY1, GLX1. It may be contemplated to provide for upsampling factors other than powers of 2. In that case the shift-left operation should be replaced by a multiplier, which is computationally more expensive.

Initial upper boundary values are computed as $Y\text{max}=Y\text{min}+CDi.KC$ (See FIG. 7A: adder GLY5)

$X\text{max}=X\text{min}+CDi.KC$ (See FIG. 7B: adder GLX5)

Final lower boundary values [Ymin, Xmin] for the mapping window are computed as:

$Y\text{min}=CDi.S2*Yodd+Y\text{min}>>CDi.S2$ (See FIG. 7A: multiplexer GLY3, shift-right element GLY4 and adder GLY6 respectively)

$X\text{min}=CDi.S2*Xodd+X\text{min}>>CDi.S2$ (See FIG. 7B: multiplexer GLX3, shift-right element GLX4 and adder GLX6 respectively)

Therein the value pair [Xodd, Yodd] is assigned as [Ymin [0], Xmin [0]], i.e. the least significant bit of Ymin and Xmin at the output of GLY2, GLX2.

It becomes apparent from FIG. 7A, 7B, that the multiplications CDi.S2*Yodd and CDi.S2*Xodd boil down to a simple selection operation performed by GLY3 and GLX3 respectively.

Final upper boundary values [Ymax, Xmax] for the mapping window are computed as:

$Y\text{max}=Y\text{max}>>CDi.S2$ (See FIG. 7A: shift-right element GLY7)

$X\text{max}=X\text{max}>>CDi.S2$ (See FIG. 7B: shift-right element GLX7)

With these values [Xmin, Ymin], [Xmax, Ymax] it is determined in the section of the logic module MGL shown in FIG. 7C whether or not the message has a destination within the destination processor cluster in accordance with its associated message generation control data CDi. To that end, it determines whether at least one of the values Xmin, Xmax is within the range [0,W), and additionally at least one of the values Ymin, Ymax is within the range [0,H).

In the pseudo hardware implementation shown in FIG. 7C, comparators XMN,XMX respectively determine if the values Xmin, Xmax are within the range [0,W). Then logic element ORX determines whether this is the case for at least one of the values Xmin, Xmax. Likewise, comparators YMN,YMX respectively determine whether or not the values Ymin, Ymax are within the range [0,H), and logic element ORY determines whether this is the case for at least one of the values Ymin, Ymax. It is noted that in case the comparisons XMN and XMX in the section are performed sequentially, for example in case of a software implementation, the second comparison can be skipped if the first comparison shows that the tested value Xmin or Xmax was within the range. This applies similarly in case of sequential comparisons performed for Ymin, Ymax. Logic gate ANDXY issues a signal "Hit" if and only if both outputs of ORX and of ORY are confirmative.

In some embodiments the comparator modules XMN, XMX, YMN, YMX may be provided as a full fledged comparator module that performs the comparison for arbitrary values. Alternatively the comparator modules may be provided as bitwise comparators. Therewith the allowable target coordinate range can be selected from powers of 2.

By way of example such an embodiment of the comparator module XMN is shown in FIG. 7D. The comparator modules XMX, YMN, and YMX may be provided similarly. The comparator module XMN shown in FIG. 7D comprises a mask register MR with respective mask bits that each are representative for a respective power of 2 and respective logic gates BC2, . . . , BC6 for bitwise comparison with a corresponding bit Xmin[2], . . . , Xmin[6] of the computed minimum value Xmin in this case and a combination module BCM. The combination module issues an invalid match signal if at least one of the logic gates BC2, . . . , BC6 indicates that a bit of a computed minimum/maxim value is set while the corresponding mask bit is not set. For example, if bits MR2 and MR3 are set as true, but the remaining bits are set as false, any input value equal to or greater than 16 will result in an invalid match signal. Likewise the range can be restricted to <4, <8, <32 or <64. In this embodiment the bitlines Xmin[7] and Xmin[8] are directly provided as an input to the combination module BCM. In this example it is presumed that the coordinate range for X and Y is restricted between 0 and 127. Hence, in any case an invalid match signal will be issued if the input value is equal to or greater than 128, or if the input value is negative as specified by bit 8 of the input signal Xmin.

If the logic module section of FIG. 7C, optionally comprising the comparator modules of FIG. 7D, issues the signal Hit, an output message is generated and transmitted to the relevant destination processor cluster. Message generation comprises a computation of a pattern ID offset value as follows:

$\text{PatternIDoffset}=(Z<<2*S2)+S2(2*Yodd+Xodd)$

As shown in FIG. 7E this result can be determined very computation efficiently, for example using a shift-left by-two to the left, while shifting in [Yodd,Xodd] instead of "00" as in the regular shift operation.

Figure 8:
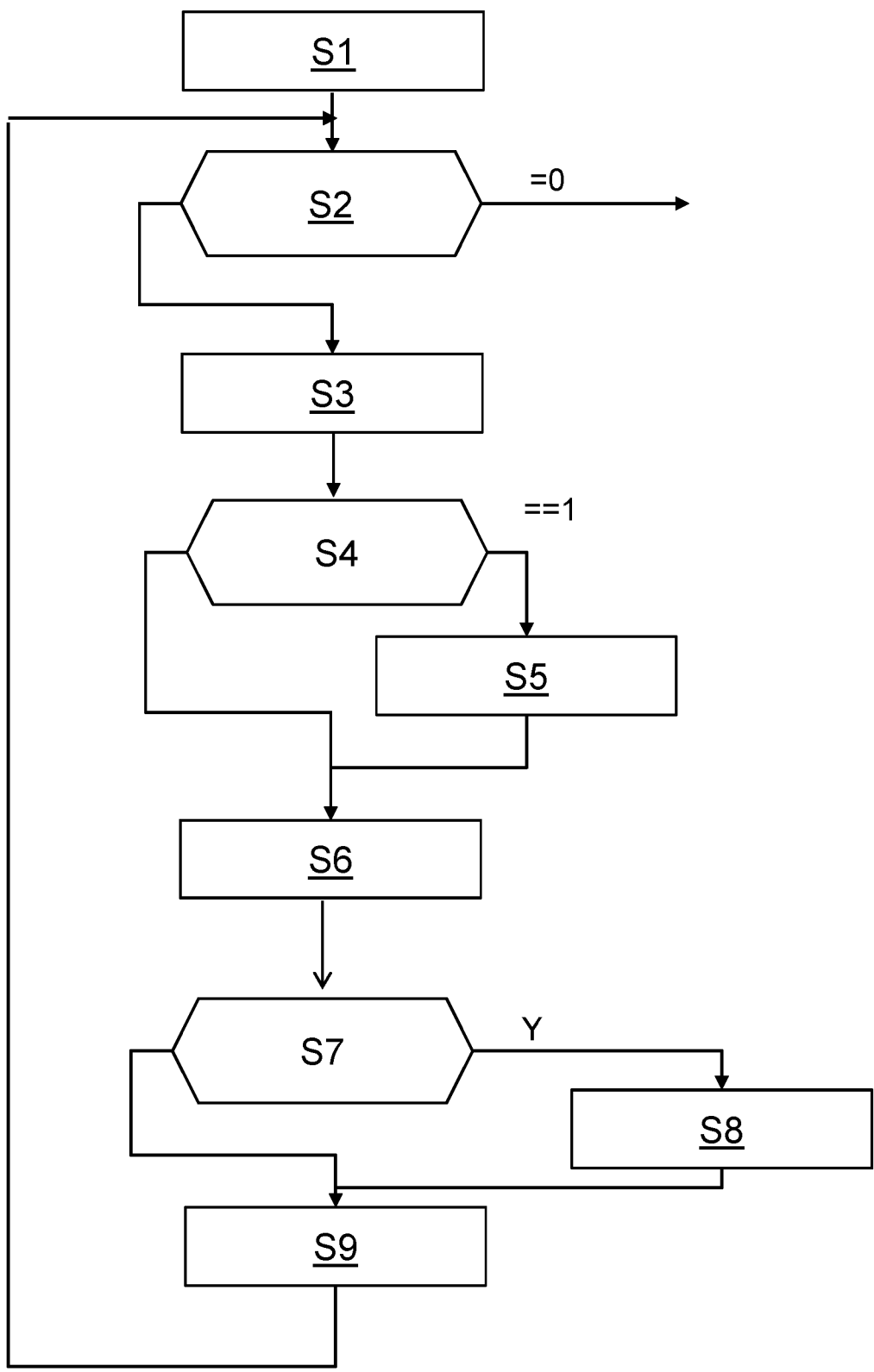
FIG. 8 schematically shows a method of operating a message based multi-processor system.

FIG. 8 schematically shows a method of operating a message based multi-processor system 1. The message based multi-processor system is for example provided according to the embodiment as shown in, and described with reference to FIGS. 1 and 2. In summary, the message based multi-processor system comprises a message exchange network R,L and a plurality of processor clusters Ci,j (See e.g. FIG. 2) capable to mutually exchange messages via the message exchange network. Each processor cluster Ci,j comprising one or more processor cluster elements PCE and a message generator MG with a logic module MGL and a message generator control storage space MGM.

The exemplary embodiment of the method shown in FIG. 8 proceeds according to the following steps.

In an initialization step S1, the following input parameters are obtained ControlDataStart; ControlDataPreStop, N; Value, FMstart; FMsizeZv; FMsizeY; FMsizeX; It is noted that specifying the value FMstart enables the option to map multiple FMs to a common layer. It is further noted that it is alternatively possible to provide the X,Y,Z and Nrel directly as an input and make this independent of the message generator. This simplifies subsequent computations.

The input parameters ControlDataStart; ControlDataPreStop are obtained from a pattern-memory. The input parameter ControlDataStart indicates the location of the first set of control data therein. The input parameter ControDataPreStop indicates the end of the last set of control data.

The input parameters N and Value specify the ID (e.g. coordinate values of the processor cluster element) in the processor cluster and value of the firing neural processor layer element. A frame is specified by FMstart; FMsizeZv; FMsizeY; FMsizeX;

Therein FMstart indicates the index of the first processor cluster element of the current processor cluster. The parameters FMsizeZv; FMsizeY; FMsizeX indicate the size of a feature map or portion thereof represented by the processor cluster. I.e. the parameters FMsizeX and FMsizeY indicate the size of the feature map in the spatial directions X,Y and FMsizeZv indicates the number of feature maps in represented by the processor cluster.

With these input parameters, the following initial steps are performed: The neuron-id Nrel relative to the start position is computed as $Nrel=N-FMstart$ The position [X,Y,Z] of the processor cluster element that issues an activation signal Sact(X,Y,Z) in the source feature map is determined from its relative address. This operation can be symbolically expressed as:

$[X,Y,Z]=getXYZ(Nrel,FMsizeZv;FMsizeY,FMsizeX)$

The relative processor cluster element Nrel may be related to the position [X,Y,Z] as Nrel=X+FMsizeX*Y+FMsizeX*FMsizeY*Z. this example it is presumed that the neuron-IDs are assigned in a X first, Y second, Z last layout/fashion. It is noted that every other way of assigning neuron ID is possible as long as it is sufficiently well-defined to enable a reconstruction of the coordinates X,Y,Z from the NeuronID.

In an embodiment the values for FMsizeX and FMsizeY are a power of 2, so that the value of Nrel can be efficiently calculated with $Nrel=X+Y<<^2 \log FMsizeX+Z<<(^2 \log FMsizeX+^2 \log FMsizeY)$ Accordingly the coordinates X,Y,Z can be derived from Nrel as:

$X=Nrel[0:^2 \log FMsizeX-1]$ $Y=Nrel[^2 \log FMsizeX:^2 \log FMsizeX+^2 \log FMsizeY-1]$ $Z=Nrel[^2 \log FMsizeX+^2 \log FMsizeY:]$ Instead of computing the coordinate values for each instance, the coordinate values may alternatively be computed incrementally. For example the processor cluster element states may be updated on a cyclic basis, starting from the first processor cluster element in the cluster having coordinates (0,0,0) to the last one, while incrementally updating the coordinate values.

A value of a control parameter DestNum, indicating a number of destination processor clusters, is initialized.

A value of a further control parameter DestInd is initialized at 0. This further control parameter is an index specifying a respective set of message control parameters for a respective destination processor cluster.

In step S2 the value of the control parameter DestNum is verified. If the value of DestNum is 0, the procedure ends. If the value of DestNum differs from zero, one or more of the procedural steps S3-S9 are performed as specified below.

In step S3 the message generation control data CDi for the destination processor cluster referred to by the destination index DestInd are read from the message generator control storage space MGM.

In step S4 a Boolean value of a further message type indication "Flatten" is determined. If the Boolean value is True, a step S5 is performed, which is succeeded by a step S6. If the Boolean value is False, procedure directly continues with step S6.

In step S5 the coordinates [X,Y,Z] are assigned as follows.

$[X,Y,Z]=[0,0,Nrel]$

In step S6 the following computations are performed. Initial lower boundary values [Ymin, Xmin] for the mapping window are computed as:

$Ymin=Yoffset+Y<<UpSamp$ $Xmin=Xoffset+X<<UpSamp$

Initial upper boundary values are computed as $Ymax=Ymin+KC$ $Xmax=Xmin+KC$

The value pair [Xodd, Yodd] is assigned as [Ymin[0], Xmin[0]]

Final lower boundary values [Ymin, Xmin] for the mapping window are computed as:

$Ymin=S2*Yodd+Ymin>>S2$ $Xmin=S2*Xodd+Xmin>>S2$

Final upper boundary values [Ymax, Xmax] for the mapping window are computed as:

$Ymax=Ymax>>S2$ $Xmax=Xmax>>S2$

With these values it is determined whether or not the message has a destination within the destination processor cluster corresponding to the message generation control data using the following function $Hit=hitDetect(Ymin,Ymax,Xmin,CutHeight,CutWidth);$ If it is determined in step S7 that the boolean Hit was set to True in a preceding step, then in step S8 a message is prepared to be sent to the destination address as follows. The message comprises the following information.
  a) DstClsIDY, DstClsIDX, together specifying the network address of the destination processor cluster,
  b) DestN, the address of the destination processor cluster element in that destination processor cluster,
  c) SynType, indicating a type of operation to be performed by the destination processor cluster,
  d) PatternID0+PatternID, an indication of a spatial pattern, e.g. a convolution pattern.
  e) Value. A value to be used in an operation to be performed by the processor cluster for the processor cluster element which is specifically referred to in case of a non-packed message or to a set of processor cluster elements within a range defined by the spatial pattern, typically centered around and including the destination processor cluster element designated in the message.

Regardless the value of the boolean Hit, in step S9 the control value that indicates the control word to be used is updated according to and if it is determined that processor cluster has a further destination processor cluster the same procedure is applied from step S3 onwards for this further destination processor cluster.

Examples

Exemplary configurations of embodiments of the improved message based multi-processor system are discussed below.

Convolution with Padding.

Figure 9:
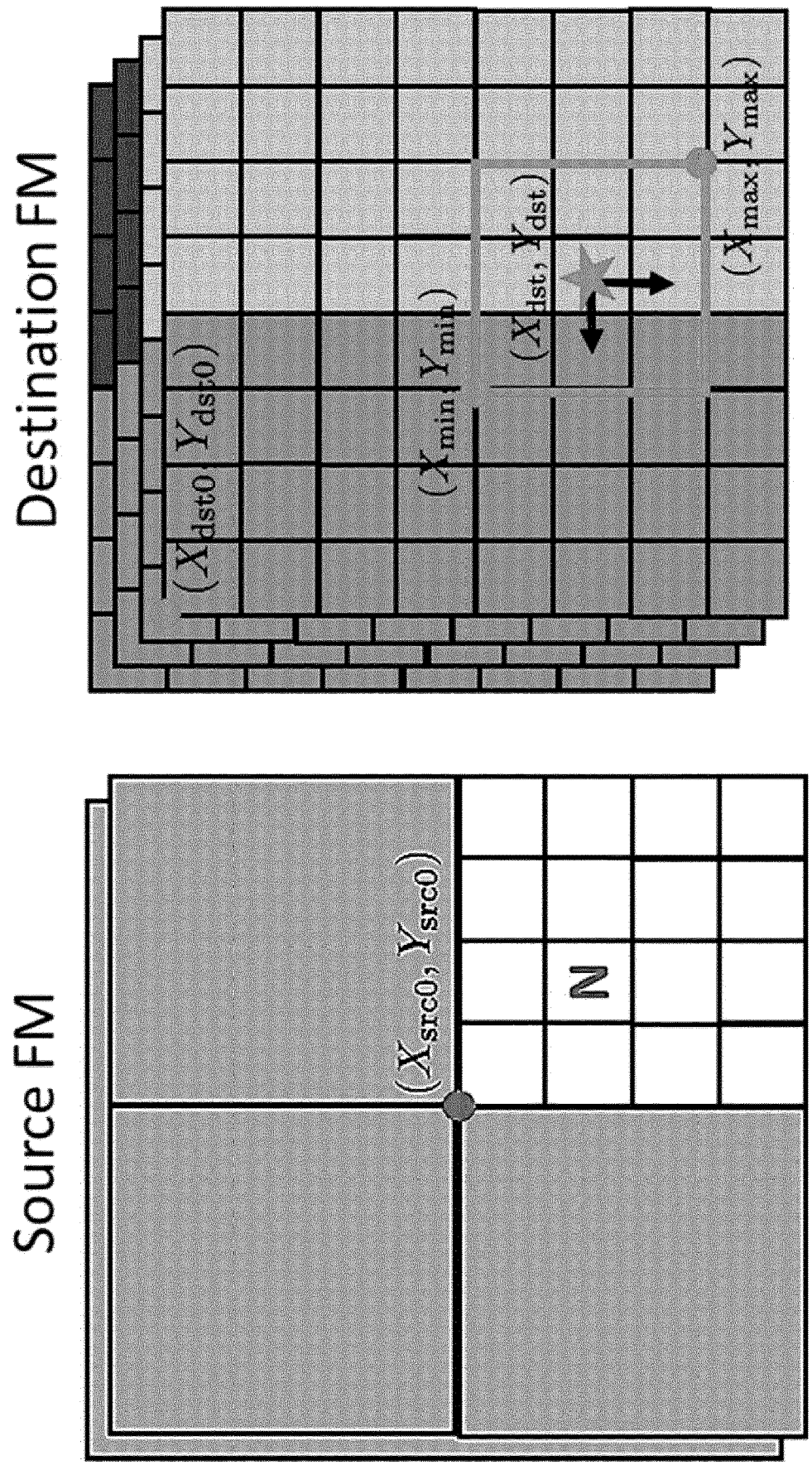
FIG. 9 shows an example wherein the improved message based multi-processor system is configured as a neural network processor that comprises a neural network processing layer to perform a convolution with padding.

In one example shown in FIG. 9, the improved message based multi-processor system is configured as a neural network processor that comprises a neural network processing layer to perform a convolution with padding.

In this configuration the XY-size (W,H) of the destination feature map is the same as the XY size of source feature map. Furthermore, the values for Ymin and Xmin in the destination feature map are computed as follows:

$$Xmin=X-(kernelSizeX-1)/2$$

$$Ymin=Y-(kernelSizeY-1)/2$$

Therein kernelSizeX, kernelSizeY are the dimensions of the convolution kernel. These may be equal in value, i.e. KernelSizeX=KernelSize=KernelSize.
I.e.

$$\Delta X_{min} = \frac{KernelSize - 1}{2} = \frac{KC}{2}$$

$$\Delta Y_{min} = \frac{KernelSize - 1}{2} = \frac{KC}{2}$$

Convolution without Padding

FIG. 10 shows a convolution without padding. In this configuration of the improved message based multi-processor system a partitioning of the destination feature map (hit detection) can be the same as with zero padding.

Figure 11:
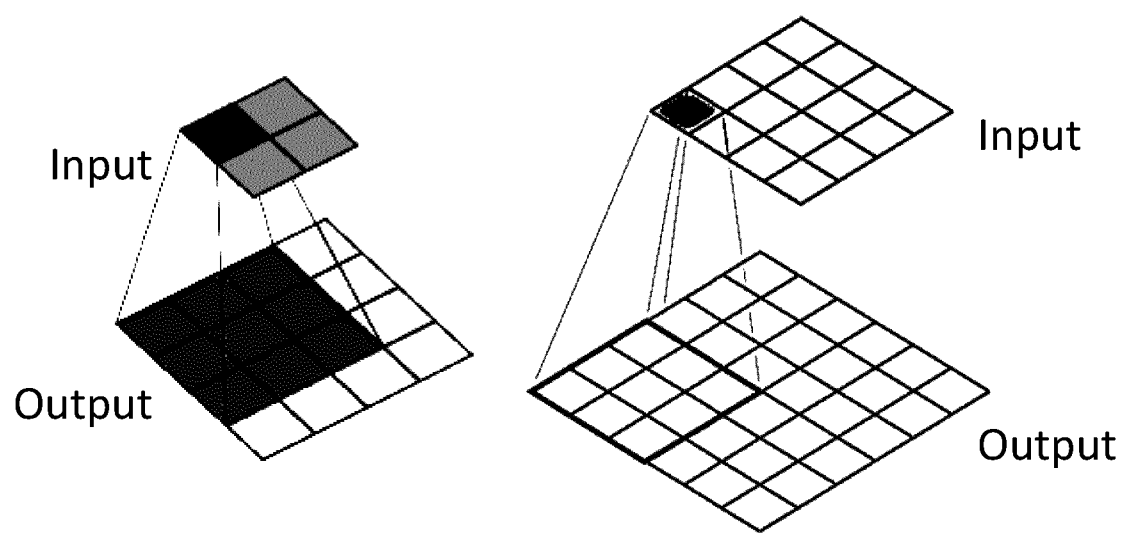
FIG. 11 shows aspects of a configuration for a transpose convolution.

The XY size of the destination feature map is equal to the XY size of the source feature map minus (KernelSize−1). Furthermore:
Ymin and Xmin in the destination feature map respectively are equal to Y and X in the source minus (KernelSize−1), and
Ymax and Xmax in the destination feature map are equal to X and Y in the source.
Transpose Convolution Also in case of a transpose convolution, see FIG. 11, often referred to as a deconvolution, a partitioning of the destination feature map (hit detection) can be the same as for regular convolutions.
The XY size of the destination FM is equal to XY size of source FM plus (KernelSize−1)
The values for Ymin and Xmin in the destination feature map are equal to Y and X in the source FM.
The values for Ymax and Xmax in the destination FM are equal to X and Y in the source FM plus (KernelSize−1)
Concatenating Feature Maps As shown in FIG. 12A, 12B, independent feature maps may be concatenated to one larger FM in a next layer. A concatenation can be merged with a subsequent convolution to save on neural network layer elements, i.e. processor cluster elements assigned as neural network layer elements. The same principles apply as for partitioning a feature map to assign partitions thereof to respective processor clusters.

In one example, see FIG. 12A, three 2D FMs are concatenated into one 3D FM. In that case, each of the three incoming PatternIDs (events from different sources) point to the same processor element addresses (arranged in a 3D coordinate system) but to different pattern memory startpoints (to have different weights per source). Therewith a transformation into a one 3D-FM is obtained on the fly, while applying the convolutions.

Figure 13A:
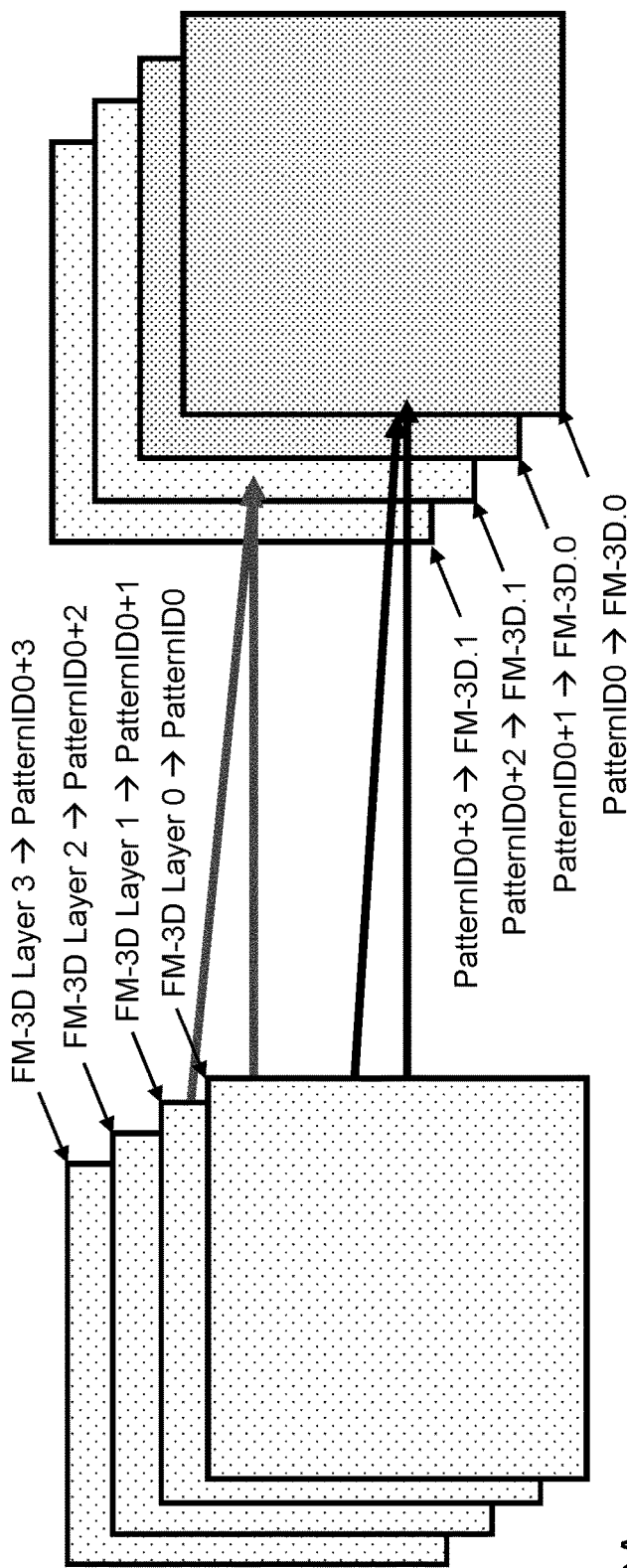
FIG. 13A, 13B shows aspects of a configuration for splitting a feature map into a plurality of feature maps.
Figure 13B:
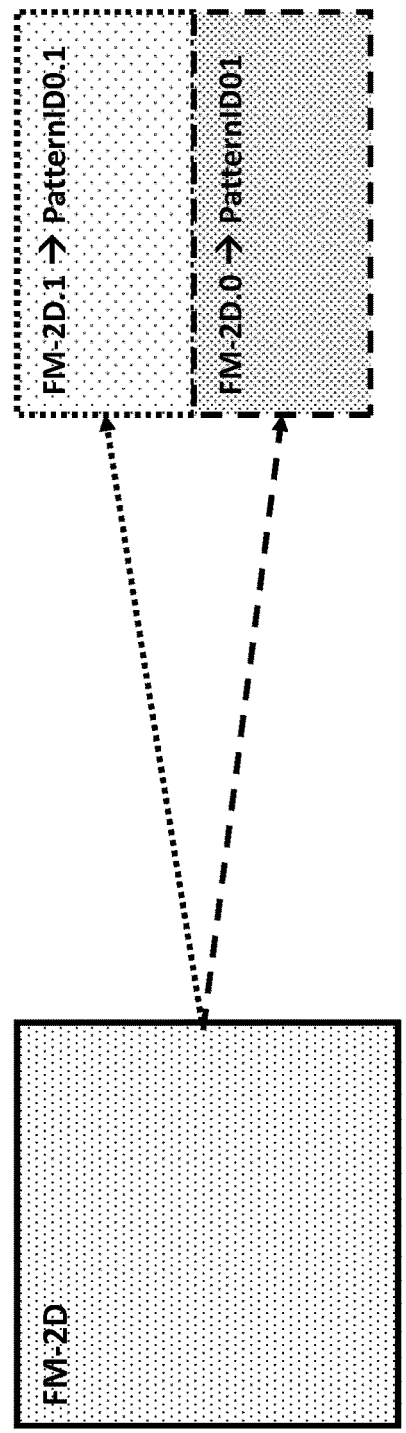

As shown further in FIG. 12B, partitions in the XY plane can be simply controlled by setting the values for OffsetY and OffsetX.
Splitting Feature Maps As shown in FIG. 13A, 13B, a feature map may be split into a plurality of FMs. This can be combined with a subsequent convolution to save on neural network layer elements, i.e. processor cluster elements assigned as neural network layer elements.

In the example shown in FIG. 13A, a single 3D FM is split into two 3D FMs. A neural network layer having spatial coordinates (X,Y) and a Z-coordinate indicative for a particular feature is denoted as a 3D-FM. A generalization is possible, wherein multiple feature maps are defined in more than two spatial dimensions (X1, X2, . . . , Xn).

If a processor cluster element PCE gives rise to an activation signal (representing a neuron of source-FM layer 0 or 1 that fires) then PatternID0 or PatternID0+1 will be on outgoing event. This implies that in the destination cluster, Pattern-ID0 and PatternID0+1 will direct via a population memory to FM-3D.0 (green part) and the convolution is applied only on green part If a neuron of source FM layer 2 or 3 fires then PatternID0+2 or PatternID0+3 will be on outgoing event. Consequently, in the destination cluster, Pattern-ID0+2 and PatternID0+3 will direct via NPM to FM-3D.1 (yellow part).

In some embodiments the logic module MGL of the message generator may be extended with an additional detection section that detects whether also for the Z-coordinate at least one of a computed minimum value Zmin and the computed maximum value Zmax is within a corresponding range SizeZ for that coordinate. Alternatively, if such a further detection section is absent, and it can not be avoided that a message is transmitted also to destination processor clusters that would otherwise be excluded, these otherwise excluded destination processor clusters may apply a zero-operation pattern, i.e. a pattern having a single zero-value weight, so that effectively the processor cluster elements in that pattern are not affected by the message, as if the message was not directed to the otherwise excluded destination processor cluster at all.

Figure 14:
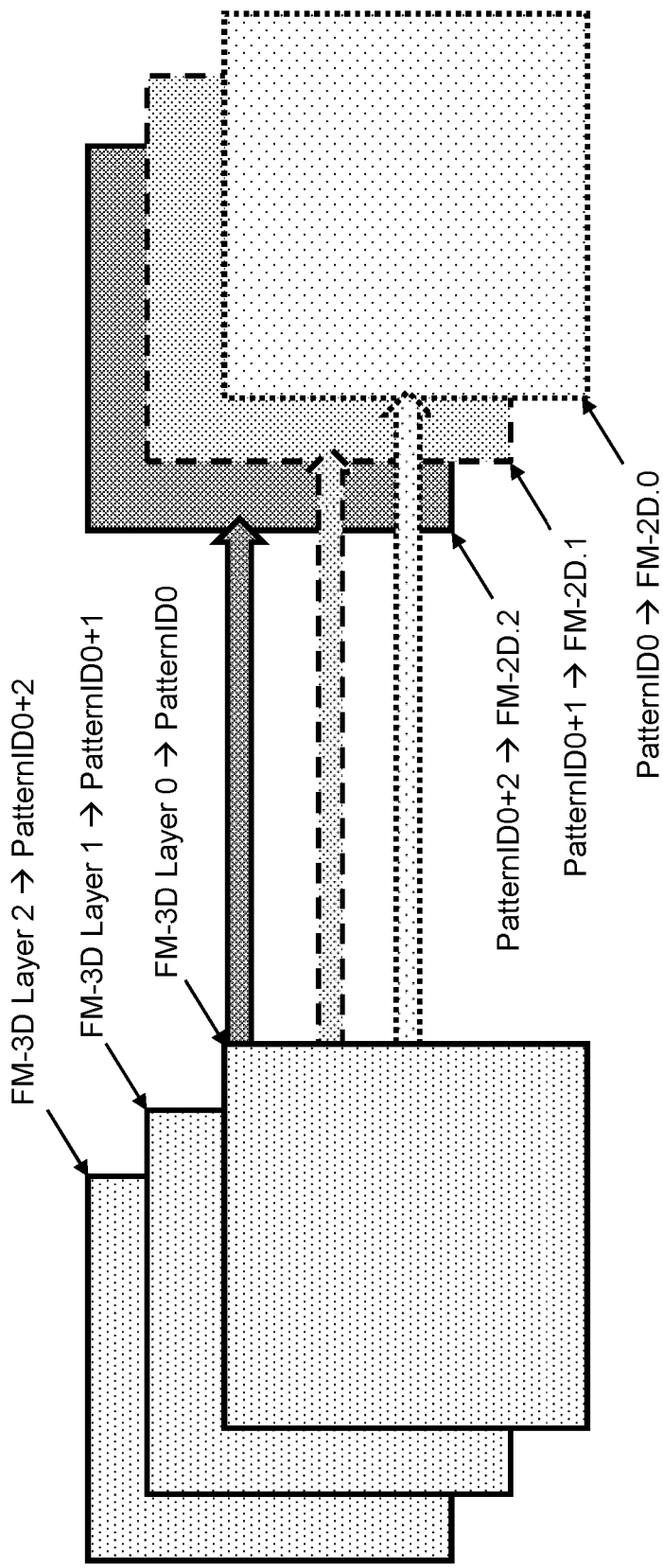
FIG. 14 shows aspects of a configuration for a depth-wise convolution.

In the example shown in FIG. 13B, a feature map is split in the XY plane. Generally, the same principles apply as for a partitioning of a single feature map over several clusters. The FM-2D will have two sets of message generation control data to specify the partitioning in XY. A partitioning in the Z-direction, as well as in the XY-plane can be realized by a combination of the principles specified in this example and the example shown in FIG. 13A.
Depth-Wise Convolution FIG. 14 shows an example of a depth-wise convolution, i.e. a convolution having a convolution pattern extending in the Z-direction. Since each Z-layer of the source/current FM has a different Pattern-ID in the destination layer (e.g., PatternID=PatternID0+Z), a depth-wise convolution is relatively straight-forward to configure. The Pattern-ID for current layer points to the correct FMstart in the destination and then a 2D pattern is read.

Figure 15:
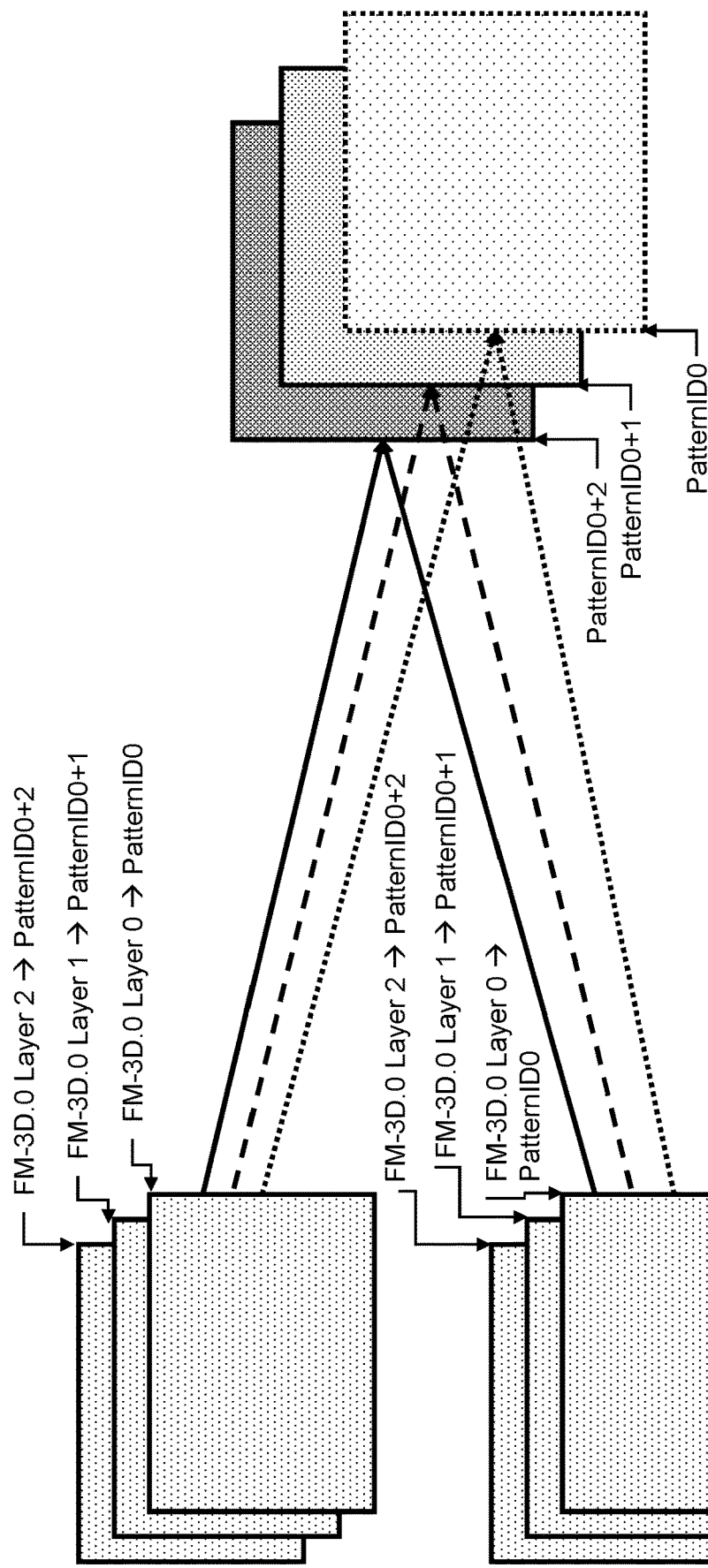
FIG. 15 shows aspects of a configuration for adding feature maps.

Hence, each destination simply is one 2D FM and the Pattern-IDs for the 2D FM are sorted. This implies that the 3D FM is simply split into parallel 2D FMs merged with a convolution (see preceding examples on splitting FMs). In order to reduce memory and processing capacity requirements, the 2D FMs may be merged to one 3D FM (see the examples of FIG. 12A, 12B on concatenating FMs).
Adding Feature Maps ResNet requires a 1×1 convolution depth-first for each feature map with a kernel of [w(0,0)=1], pointing to the same destination FM (See FIG. 15). Hence, apart from the offset values specified therein, source feature maps (X,Y) use the same message generation control data. So both convolutions will add up. Adding in this way can be further merged with a subsequent convolution (H) due to distributivity of the convolution (kernel becomes KernelSize×KernelSize). I.e. $(X+Y)*H=(X*H)+(Y*H)$. This provides for a reduction in the required number of processor cluster elements of 50%.

Combining Flattening with Preceding Convolution

Figure 16:
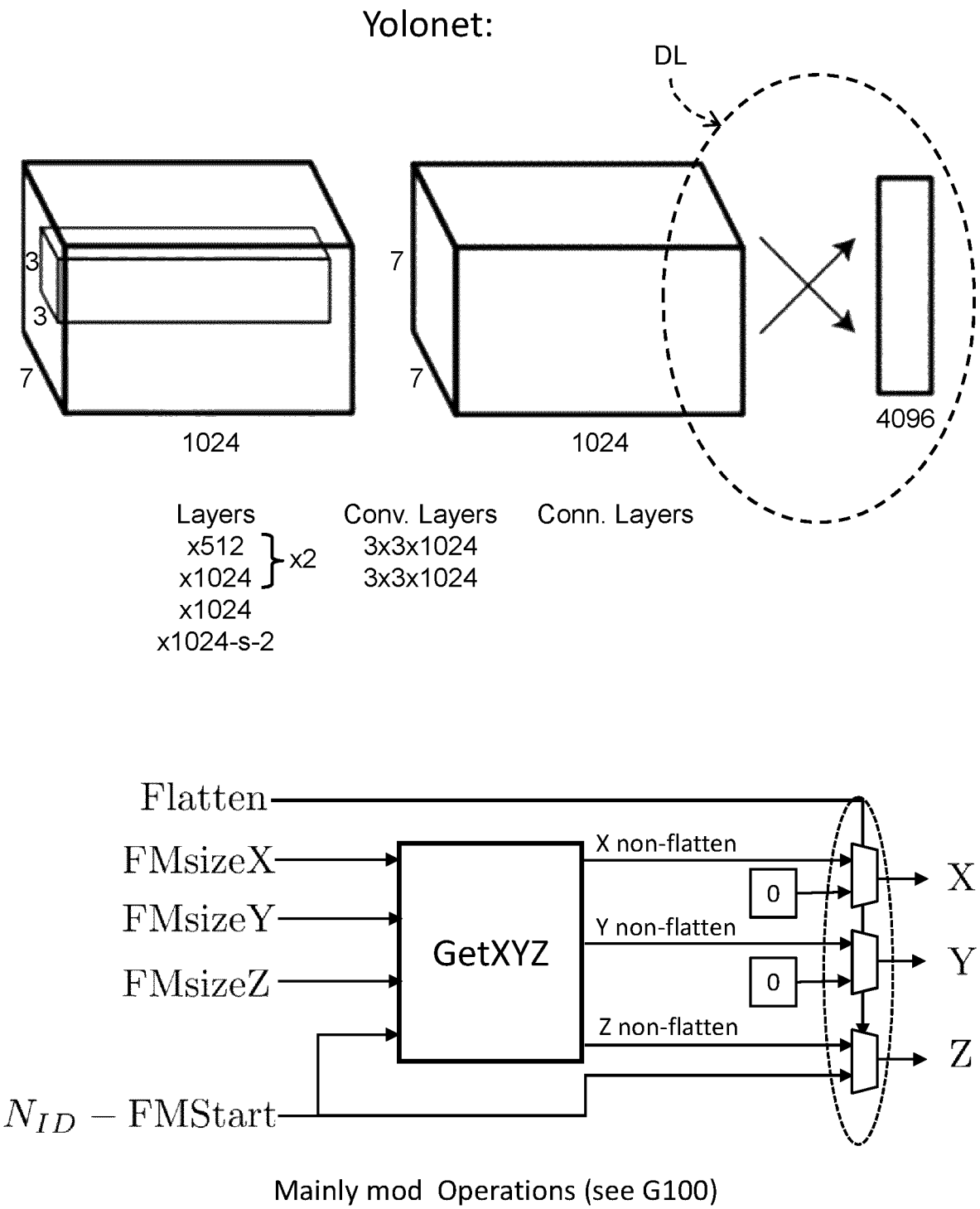
FIG. 16 shows aspects of a configuration for merging a convolution succeeded by a flattening.

FIG. 16 illustrates that a convolution succeeded by a flattening may be merged to reduce the required number of processor cluster elements. The pattern memory for the destination neural network layer indicates that the latter is configured as convolutional layer (i.e. X,Y,Z with KC>0), so that a convolution is performed. The message generation control data of the source processor cluster in that case includes a flag ("flatten") to interpret the destination neural network layer DL instead as a 1×1×Z layer See top part of FIG. 16. In hardware this just adds three multiplexers for the (X,Y,Z) calculation. See the lower part of FIG. 16.

$$N_{ID}-FM\text{Start}=FM\text{size}Y\cdot FM\text{size}Z\cdot X+FM\text{size}Z\cdot Y+Z$$

Average Pooling

Figure 17:
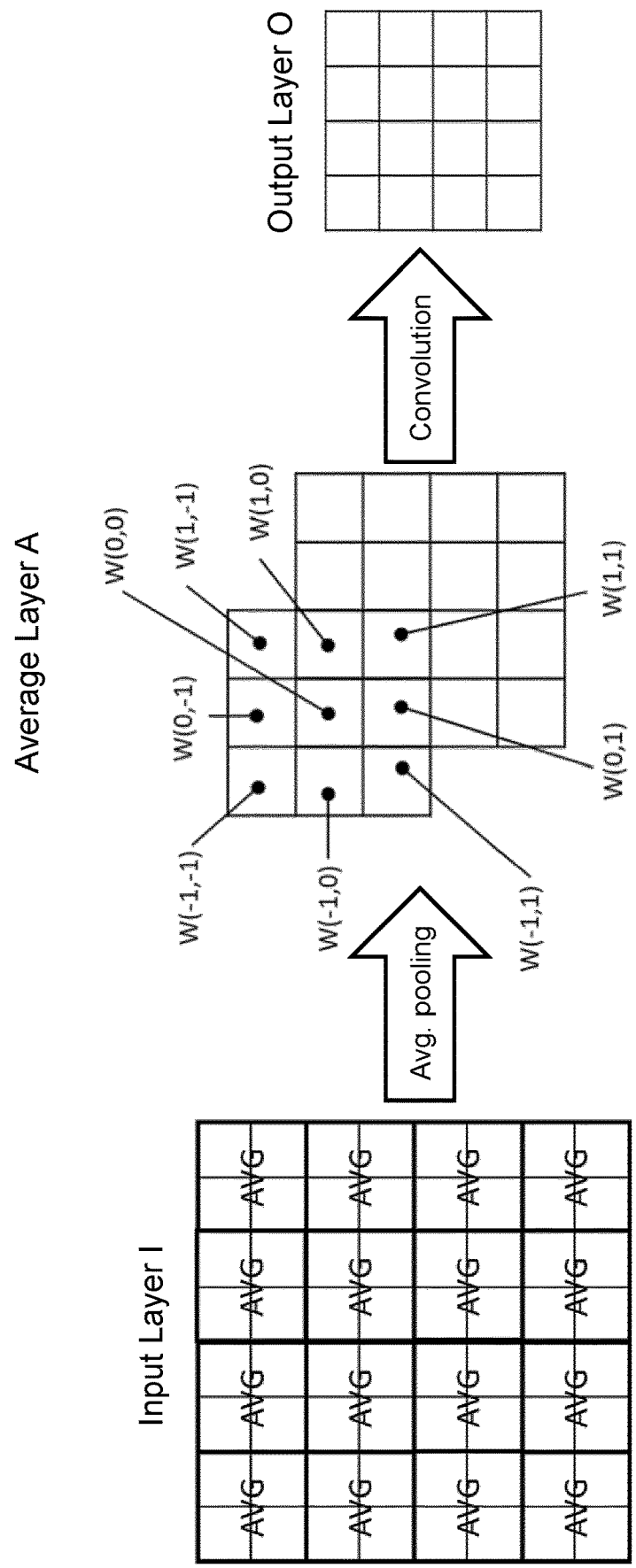
FIG. 17 shows aspects of a configuration for combining an average pooling operation with subsequent convolution.

As shown in FIG. 17, also an average pooling operation can be combined with subsequent convolution to be performed by a simple convolution layer with striding, therewith a 50% reduction in processor cluster elements is achieved.

Example 3×3 Convolution after Average Pooling

Figure 18:
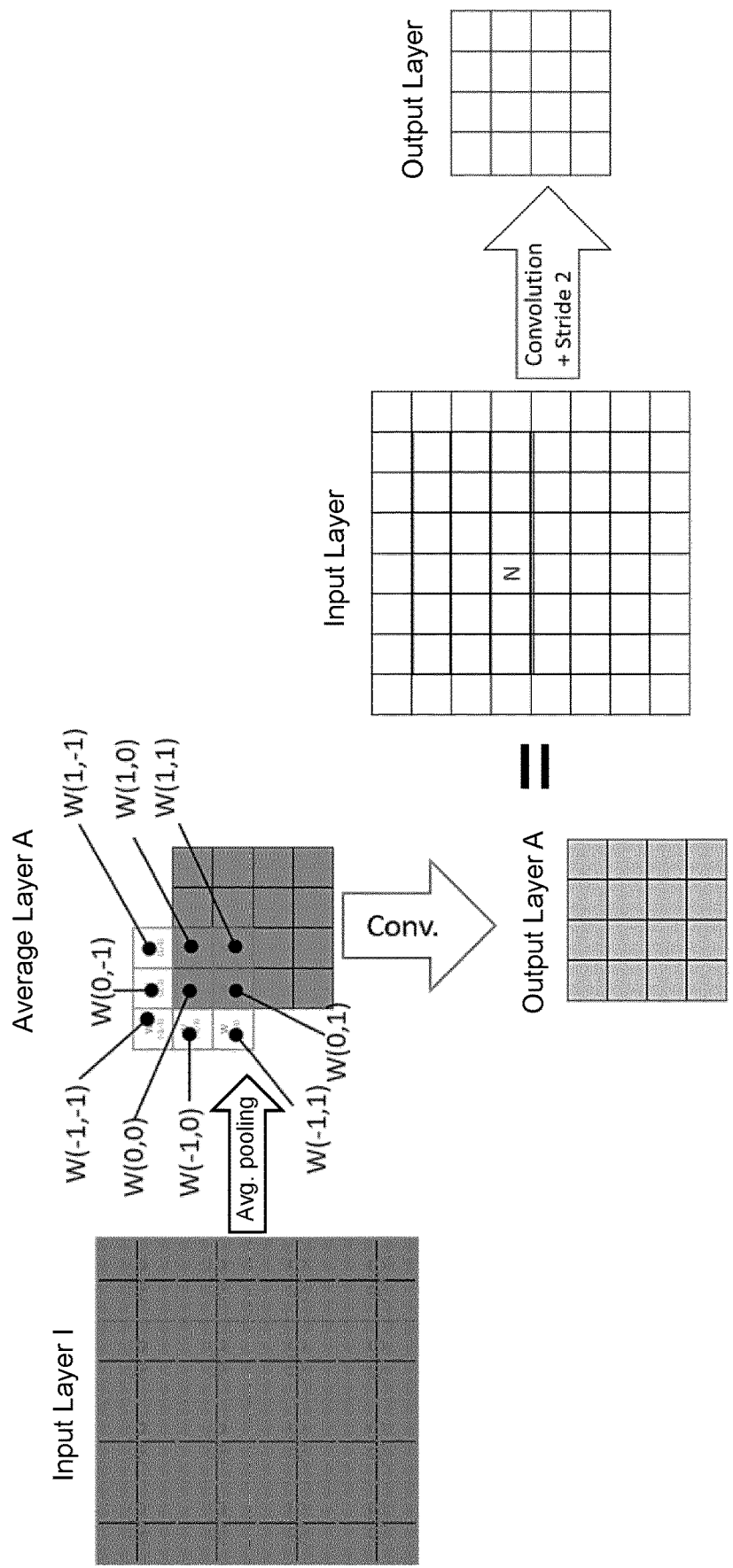
FIG. 18 shows a more specific example of this configuration.

By way of example, FIG. 18 shows how an average pooling followed by a KS×KS convolution can be realized in one step by an even (i.e., non-symmetric) 2KernelSize× 2KernelSize convolution with stride two.

The resulting strided convolution has the weights w'(−KernelSize+1,−KernelSize+1) to w'(KernelSize, KernelSize).

Figure 19:
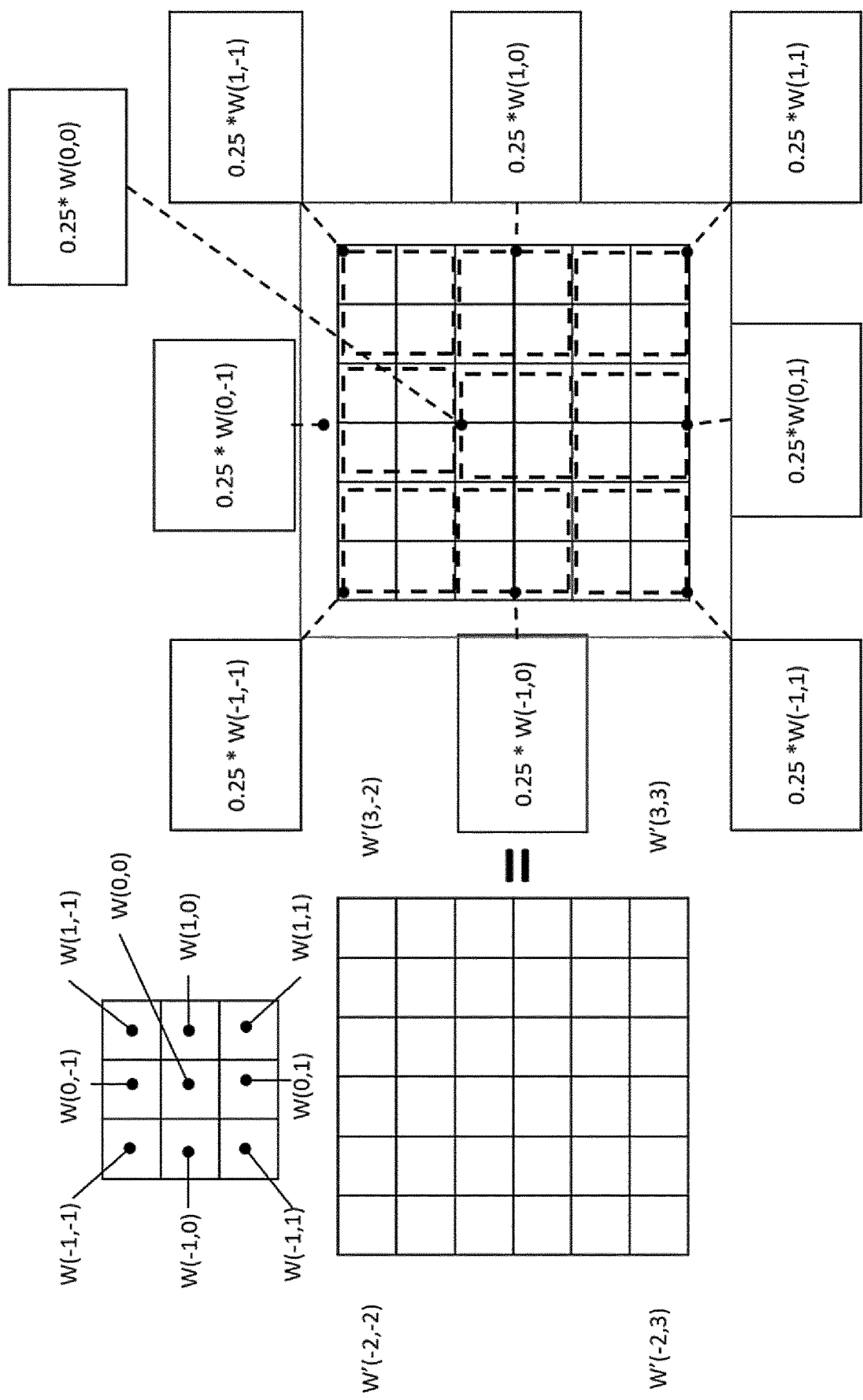
FIG. 19 show another example.

Hence, as shown in FIG. 19, an average pooling followed by 3×3 convolution is simplified to a single strided 6×6 convolution. The message control data in this example specifies.

$$\Delta X_{min}=\text{KernelSize}-1=2$$

$$\Delta Y_{min}=\text{KernelSize}-1=2$$

$$KC=2\text{KernelSize}-1=5$$

A more formal proof is provided in Annex 1:

---

ANNEX 1:

Proof that average pooling can be merged with subsequent convolution using a stride The initial/input layer is symbolized as $I \in \mathbb{BF}^{2m \times 2m}$, where $\mathbb{BF}$ indicates a 16-bit Brain Floating Point number. Moreover, the intermediate averaged layer and the output layer (after the subsequent convolution) are symbolized as $A \in \mathbb{BF}^{m \times n}$ and $O \in \mathbb{BF}^{m \times n}$ (without loss of generality, here, a zero-padded convolution is assumed). Since the output O is generated out of A by applying a convolution with a KS × KS kernel (weights: $w_{i,j}$), the following formula expresses the output layer:

$$O[x, y] = \sum_{i=-\frac{KS-1}{2}}^{\frac{KS-1}{2}} \sum_{j=-\frac{KS-1}{2}}^{\frac{KS-1}{2}} w[i, j] \cdot A[x+i, y+j] \quad (1)$$

To simplify the notation, $(KS-1)/2$ is abbreviated in the following as KH.

The relation between the intermediate average-pooled layer A and the input layer is mathematically expressed as:

$$A[x, y] = \frac{1}{4} \sum_{i=0}^{1} \sum_{j=0}^{1} I[2x+i, 2y+j] \quad (2)$$

Substituting Eq. (2) in Eq. (1) results in:

$$O[x, y] = \sum_{i=-KH}^{KH} \sum_{j=-KH}^{KH} \frac{w[i, j]}{4} \cdot \left( \sum_{i'=0}^{1} \sum_{j'=0}^{1} I[2(x+i)+i', 2(y+j)+j'] \right) \quad (3)$$

In the following, it is shown that this relationship between the output layer O and the input layer I can also be realized by means of a single convolution with a subsequent stride (a stride is a logical down-sampling by a factor two after the convolution. After, down-sampling (i.e., applying a stride) only the neurons/pixels with an even x and y address remain. That means that we don not care what the single convolution, used to present the average pooling and the subsequent convolution, is generating on the entries with an odd x or y as these values either-way will be suppressed by the subsequent down-sampling/striding. Hence - using Eq. (3) - the formula describing the output layer before sub-sampling/striding must full-fill:

$$O_{pre\text{-}sub}[2x, 2y] = O[x, y] \quad (4)$$

$$= \sum_{i=-KH}^{KH} \sum_{j=-KH}^{KH} \frac{w[i, j]}{4} \cdot \left( \sum_{i'=0}^{1} \sum_{j'=0}^{1} I[2(x+i)+i', 2(y+j)+j'] \right)$$

$$= \sum_{i=-KH}^{KH} \sum_{j=-KH}^{KH} \frac{w[i, j]}{4} \cdot \left( \sum_{i'=0}^{1} \sum_{j'=0}^{1} I[2x+2i+i', 2y+2j+j'] \right) \quad (5)$$

-continued

ANNEX 1:

As we don't care what are the entries of $O_{pre-sub}$ for odd numbered x and/or y, $O_{pre-sub}$ can be expressed as:

$$O_{pre-sub}[x, y] = \sum_{i=-KH}^{KH} \sum_{j=-KH}^{KH} \frac{w[i,j]}{4} \cdot \left( \sum_{i'=0}^{1} \sum_{j'=0}^{1} I[x + 2i + i', y + 2j + j'] \right) \quad (6)$$

Using w'[i, j] = (w[⌊i/2⌋, ⌊j/2⌋])/4, Eq. (6) can be expressed as:

$$O_{pre-sub}[x, y] = \sum_{i=-2KH}^{2KH+1} \sum_{j=-2KH}^{2KH+1} w'[i, j] \cdot I[x + i, y + j] \quad (7)$$

Comparing Eq. (7) with (1) shows that this is equal to a convolution with an even (i.e., non-symmetric) kernel of size 2KH + 2KH + 2 = 2KS.

Thus, an average pooling followed by a convolution can be expressed by a convolution with a kernel that is increased by a factor two and a subsequent down-sampling/striding. This allows to save the number of required neurons by 50%.

For example, an average pooling followed by convolution with a 3 × 3 kernel:

$$\begin{pmatrix} w_{-1,-1} & w_{0,-1} & w_{1,-1} \\ w_{-1,0} & w_{0,0} & w_{1,0} \\ w_{-1,0} & w_{0,1} & w_{1,1} \end{pmatrix}, \quad (8)$$

can be substituted by a single strided convolution with:

$$\begin{pmatrix} w'_{-2,-2} & w'_{-1,-2} & w'_{0,-2} & w'_{1,-2} & w'_{2,-2} & w'_{3,-2} \\ w'_{-2,-1} & w'_{-1,-1} & w'_{0,-1} & w'_{1,-1} & w'_{2,-1} & w'_{3,-1} \\ w'_{-2,0} & w'_{-1,0} & w'_{0,0} & w'_{1,0} & w'_{2,0} & w'_{3,0} \\ w'_{-2,1} & w'_{-1,1} & w'_{0,1} & w'_{1,1} & w'_{2,1} & w'_{3,1} \\ w'_{-2,2} & w'_{-1,2} & w'_{0,2} & w'_{1,2} & w'_{2,2} & w'_{3,2} \\ w'_{-2,3} & w'_{-1,3} & w'_{0,3} & w'_{1,3} & w'_{2,3} & w'_{3,3} \end{pmatrix} = \quad (9)$$

$$\frac{1}{4} \begin{pmatrix} w_{-1,-1} & w_{-1,-1} & w_{0,-1} & w_{0,-1} & w_{1,-1} & w_{1,-1} \\ w_{-1,-1} & w_{-1,-1} & w_{0,-1} & w_{0,-1} & w_{1,-1} & w_{1,-1} \\ w_{-1,0} & w_{-1} & w_{0,0} & w_{0,0} & w_{1,0} & w_{1,0} \\ w_{-1,0} & w_{-1,0} & w_{0,0} & w_{0,0} & w_{1,0} & w_{1,0} \\ w_{-1,1} & w_{-1,1} & w_{0,1} & w_{0,1} & w_{1,1} & w_{1,1} \\ w_{-1,1} & w_{-1,1} & w_{0,1} & w_{0,1} & w_{1,1} & w_{1,1} \end{pmatrix}$$

The invention claimed is:

1. A message based multi-processor system comprising:
a message exchange network; and
a plurality of processor clusters to mutually exchange messages via the message exchange network, wherein each processor cluster comprises:
one or more processor cluster elements, and
a message generator;
wherein the message based multi-processor system is configured or configurable as a neural network processor system having a plurality of neural network processing layers, where each neural network processing layer is assigned one or more processor clusters of the plurality of processor clusters with associated processor cluster elements of the processor clusters being neural network processing elements;
wherein the message generator of each processor cluster associated with a neural network processing layer of the plurality of neural network processor layers comprises:
a logic module, and
an associated message generator control storage space comprising respective message generation control data for respective destination processor clusters in a set of destination processor clusters,
wherein the logic module of the message generator is configured to:
perform, in response to an activation signal of a processor cluster element, a respective computation using the message generation control data for each destination processor cluster in the set of destination processor clusters and one or more coordinate values of the processor cluster element associated with the activation signal to:
determine a destination range for the destination processor cluster comprising, for at least one coordinate, a minimum coordinate value and a maximum coordinate value, and
determine whether the destination processor cluster is a target of the processor cluster element based on whether, for each of the at least one coordinate, at least one of the minimum coordinate value or the maximum coordinate value of the destination range is within a corresponding range spanned by the destination processor cluster, and
selectively generate and transmit an output message to each destination processor cluster that was determined as a target by the respective computation.

2. The message based multi-processor system according to claim 1, wherein the minimum coordinate value and maximum coordinate value are computed for respective coordinates in a coordinate system of the destination processor cluster,
wherein the logic module is configured to:
enable message transmission if, for each of the respective coordinates, at least one of the minimum coordinate value or the maximum coordinate value is within the corresponding range for the coordinate, and disable message transmission if, for any of the respective coordinates, neither the minimum coordinate value nor the maximum coordinate value are within the corresponding range.

3. The message based multi-processor system according to claim 2, wherein the logic module comprises, for each coordinate:
a respective first comparator module configured to provide a first match signal indicative that the minimum coordinate value for that coordinate is in the corresponding range;
a respective second comparator module configured to provide a second match signal indicative that the maximum coordinate value for that coordinate is in the corresponding range; and
a logic OR gate to provide a third match signal indicative that at least one of the first match signal or the second match signal is valid for the coordinate, the logic module further comprising a logic AND gate to provide a message transmission enable signal if the third match signal for each of the coordinates is valid.

4. The message based multi-processor system according to claim 3, wherein at least one of the first comparator module or the second comparator module comprises:
at least one mask register having respective mask bits, each mask bit being representative for a respective power of 2 and respective logic gates for bitwise comparison with a corresponding bit of a minimum coordinate value or maximum coordinate value, and
a combination module configured to issue an invalid match signal indicating that at least one of the logic gates indicates a bit of a minimum coordinate value or maximum coordinate value is set while a corresponding mask bit is not set.

5. The message based multi-processor system according to claim 1, wherein the message generation control data comprises predetermined data indicative of an offset (Xoffs, Yoffs) that is computed in a preparatory phase as follows:

$$Xoffs=Xsrc0-Xdst0-\Delta Xmin,$$

$$Yoffs=Ysrc0-Ydst0-\Delta Ymin,$$

wherein (Xsrc0, Ysrc0) is a pair of coordinates representative for a first position of the processor cluster that is a source of the output message in its associated neural network processing layer,
wherein (Xdst0, Ydst0) is a pair of coordinates representative for a first position of the processor cluster that is specified by the message generation control data as the destination of the output message in its associated neural network processing layer, and
wherein the values $-\Delta Xmin$, $-\Delta Ymin$ are related to a convolution kernel size Wx, Wy.

6. The message based multi-processor system according to claim 1, wherein the message generation control data comprises an indicator that the processor cluster elements of the destination processor cluster are arranged in one dimension and have a coordinate value for the one dimension that is proportional to an index of the processor cluster elements in the destination processor cluster.

7. The message based multi-processor system according to claim 1, wherein the message generation control data comprises an indicator specifying stride changes.

8. The message based multi-processor system according to claim 1, wherein the message generation control data comprises an indicator specifying a scale factor.

9. The message based multi-processor system according to claim 1, wherein each destination processor cluster further comprises a pattern storage facility,
wherein respective entries of the pattern storage facility specify a spatial pattern of processor cluster elements in a space of the neural network processing layer associated with the destination processor cluster, and
wherein the message generation control data comprises a reference to an entry in the pattern storage facility.

10. The message based multi-processor system of claim 1, wherein the message generation control data further comprises an indication of a message distribution pattern, wherein the output message conveys the indication, and wherein the destination processor cluster receiving the output message is configured to apply the output message to a set of core elements of the destination processor cluster in accordance with a pattern specified by the indication.

11. A method of operating a message based multi-processor system, wherein the message based multi-processor system comprises:
a message exchange network; and
a plurality of processor clusters to mutually exchange messages via the message exchange network, wherein each processor cluster comprises one or more processor cluster elements, and a message generator including a logic module and a message generator control storage space; and
wherein the method comprises:
configuring, in a first phase, the message based multi-processor system as a neural network processor having a plurality of neural network processing layers, by assigning to each neural network processing layer a respective subset of one or more of the processor clusters including associated processor cluster elements, wherein the associated processor cluster elements form neural network processing elements therein;
writing, in the first phase, in respective storage entries of the message generator control storage space of a source processor cluster, respective sets of message generation control data for respective destination processor clusters in a subsequent neural network processing layer;
activating, during a second phase, in a source processor cluster element of the source processor cluster, the message generator;
performing, by the message generator in response to the activating, the following for each set of message generation control data of the source processor cluster, operations comprising:
a) retrieving the set of message generation control data from the respective storage entry;
b) performing a respective computation using the message generation control data for the respective destination processor cluster in the set of destination processor clusters and one or more coordinate values of the source processor cluster element to:
determine a destination range for the destination processor cluster comprising, for at least one coordinate, a minimum coordinate value and a maximum coordinate value, and determine whether the destination processor cluster is a target of the processor cluster element based on whether, for each of the at least one coordinate, at least one of the minimum coordinate value or the maximum coordinate value of the destination range is within a corresponding range spanned by the destination processor cluster; and selectively generate and transmit an output message to each destination processor cluster that was determined as a target by the respective computation.

12. The method of operating a message based multi-processor system according to claim 11, wherein the message generation control data further comprises an indication of a message distribution pattern, wherein the output message conveys the indication, and wherein the destination processor cluster receiving the output message applies the output message to a set of core elements of the destination processor cluster in accordance with a pattern specified by the indication.

13. The method of operating a message based multi-processor system according to claim 11, wherein the minimum coordinate value and maximum coordinate value are computed for respective coordinates in a coordinate system of the destination processor cluster, the operations further comprising:

enabling message transmission if, for each of the respective coordinates, at least one of the minimum coordinate value or the maximum coordinate value is within the corresponding range for the coordinate, and disabling message transmission if, for any of the respective coordinates, neither the minimum coordinate value nor the maximum coordinate value are within the corresponding range.

14. The method of operating a message based multi-processor system according to claim 13, the operations further comprising, for each coordinate:

determining, by a first comparator module, whether to provide a first match signal indicative that the minimum coordinate value for that coordinate is in the corresponding range; and determining, by a second comparator module, whether to provide a second match signal indicative that the maximum coordinate value for that coordinate is in the corresponding range;

wherein a logic OR gate provides a third match signal if at least one of the first match signal or the second match signal is valid for the coordinate, and a logic AND gate provides a message transmission enable signal if the third match signal for each of the coordinates is valid.

15. The method of operating a message based multi-processor system according to claim 14, wherein at least one of the first comparator module or the second comparator module comprises:

at least one mask register having respective mask bits, each mask bit being representative for a respective power of 2 and respective logic gates for bitwise comparison with a corresponding bit of a minimum coordinate value or maximum coordinate value, and a combination module configured to issue an invalid match signal indicating that at least one of the logic gates indicates a bit of a minimum coordinate value or maximum coordinate value is set while a corresponding mask bit is not set.

16. The method of operating a message based multi-processor system according to claim 11, wherein the message generation control data comprises predetermined data indicative of an offset (Xoffs, Yoffs) that is computed in a preparatory operation as follows:

Xoffs=Xsrc0−Xdst0−ΔXmin,

Yoffs=Ysrc0−Ydst0−ΔYmin, wherein (Xsrc0, Ysrc0) is a pair of coordinates representative for a first position of the processor cluster that is the source of the output message in its associated neural network processing layer, wherein (Xdst0, Ydst0) is a pair of coordinates representative for a first position of the processor cluster that is specified by the message generation control data as the destination of the output message in its associated neural network processing layer, and wherein the values −ΔXmin,−ΔYmin are related to a convolution kernel size Wx, Wy.

17. The method of operating a message based multi-processor system according to claim 11, wherein the message generation control data comprises an indicator that the processor cluster elements of the destination processor cluster are arranged in one dimension and have a coordinate value for the one dimension that is proportional to an index of the processor cluster elements in the destination processor cluster.

18. The method of operating a message based multi-processor system according to claim 11, wherein the message generation control data comprises an indicator specifying stride changes.

19. The method of operating a message based multi-processor system according to claim 11, wherein the message generation control data comprises an indicator specifying a scale factor.

20. The method of operating a message based multi-processor system according to claim 11, wherein each destination processor cluster further comprises a pattern storage facility, wherein respective entries of the pattern storage facility specify a spatial pattern of processor cluster elements in a space of the neural network processing layer associated with the destination processor cluster, and wherein the message generation control data comprises a reference to an entry in the pattern storage facility.

* * * * *